United States Patent [19]

Takenaka

[11] Patent Number: 5,859,646
[45] Date of Patent: Jan. 12, 1999

[54] GRAPHIC DRAWING PROCESSING DEVICE AND GRAPHIC DRAWING PROCESSING SYSTEM USING THEREOF

[75] Inventor: Yasuharu Takenaka, Kanagawa-ken, Japan

[73] Assignee: Kabushiki Kaisha Toshiba, Kawasaki, Japan

[21] Appl. No.: 892,158

[22] Filed: Jul. 14, 1997

Related U.S. Application Data

[63] Continuation of Ser. No. 253,693, Jun. 3, 1994, abandoned.

[30] Foreign Application Priority Data

Jun. 4, 1993 [JP] Japan ..................... 5-134385

[51] Int. Cl.$^6$ ...................................... G06F 15/00
[52] U.S. Cl. ............................................ 345/433
[58] Field of Search ..................... 345/435, 433, 345/438, 441, 113, 114, 118

[56] References Cited

U.S. PATENT DOCUMENTS

| | | | |
|---|---|---|---|
| 5,333,245 | 7/1994 | Vecchione | 395/130 |
| 5,361,349 | 11/1994 | Sugita et al. | 395/600 |
| 5,369,736 | 11/1994 | Kato et al. | 395/130 |

*Primary Examiner*—Phu K. Nguyen
*Attorney, Agent, or Firm*—Oblon, Spivak, McClelland, Maier & Neustadt, P.C.

[57] ABSTRACT

A graphic drawing processing system has a frame memory including a drawing data area for holding data for drawing on a display, and an offscreen area for holding source data for a specified pattern which is not displayed on the display. The system further includes a coordinate convertor for obtaining pattern data corresponding to picture elements to be drawn, based on pattern source data in the offscreen area, and a memory for storing one portion of the pattern source data in the offscreen area.

23 Claims, 17 Drawing Sheets

GRAPHIC DRAWING PROCESSING SYSTEM

TWO DIMENSIONAL
COORDINATES ON DISPLAY

GRAPHIC DRAWING PROCESSING DEVICE AND GRAPHIC DRAWING PROCESSING SYSTEM USING THEREOF

This application is a Continuation of application Ser. No. 08/253,693, filed Jun. 3, 1994, now abandoned.

BACKGROUND OF THE INVENTION

1. Field of the Invention

The present invention relates to a graphic drawing processing device (processor) and a graphic drawing processing system using the processor for drawing three-dimensional graphics and the like, and, in particular, to a graphic drawing processing system and device with a structure realized by a comparatively inexpensive cost whereby it is possible to perform high speed texture mapping by using a part of empty area (or unused area) in a frame memory for texture patterns during the texture mapping.

2. Description of the Prior Art

Because difficult or complicated coordinate calculations are required in texture mapping the process is normally carried out using software. However, there are cases where functions for simple coordinate conversions and the like are performed by hardware in order to implement the process at high speed.

FIG. 1 is a configuration drawing for a conventional graphic drawing processing device (processor) used in such cases. A graphic drawing processing device 100 of this conventional embodiment is provided with a texture mapping function. In FIG. 1, the graphic drawing processing device 100 has an interface section 11 for interfacing with a host CPU 3, a first and second digital differential analysis section 113 (the first differential analysis section for calculating paint-out with colors and the second digital differential analysis section for making regional decisions), an operation section 15 for performing pixel unit operations, a memory interface section 17 for controlling memory operation for a frame memory 5, and a coordinate conversion section 119 for converting coordinates in a drawing space to coordinates in a source space for texture patterns.

FIG. 2 illustrates an example of a structure for a graphic drawing system 200 using the graphic drawing processing device 100 shown in FIG. 1.

This graphic drawing system 200 is provided with a frame memory 5 formed as a Dynamic Random Access Memory (DRAM). For the data in the frame memory 5, one pixel in a display 9 uses several bits of data in the frame memory 5. In addition, in the frame memory 5 there is a data area (offscreen area) for data which is not displayed on the display 9. Two-dimensional coordinates (x, y) on the display 9 and an address 'address' for the frame memory 5 are used to correspond to the pixels on the display 9 and the frame memory 5 so that they satisfy the following equation. In addition, the correspondence of the two-dimensional address and the frame memory 5 on the display 9 is shown in FIG. 3, $$\text{address} = B + y \times MW + x \qquad (1)$$

where B=base address, MW=the number of columns in the frame memory 5.

In addition, the data area (namely, the offscreen area), data in which is not shown on the display 9, in a part of the frame memory 5 is provided in this system and texture patterns to be drawn are set in the offscreen area. In general, an empty area in the frame memory 5, or one buffer, when a double buffer structure is provided and a single buffer used, is allotted as the offscreen area.

Next, two operations and for performing graphic drawing of a triangle will now be explained using the conventional graphic drawing processing device 100 with this type of structure described above when texture mapping is not performed (A) and performed (B).

Here, parameters and a starting point for drawing used by each digital differential analysis section 113 are provided in advance. (A) In a case where texture mapping is not performed As shown in FIG. 3, starting from the initial drawing point on the two dimensional coordinates, the input of data from the frame memory 5 is displayed while the pixels are increased one by one in the x direction, and a one pixel offset is increased in the y-direction if being outside of the triangle.

The memory access at this time is carried out continuously while the drawing expands in the x-direction, therefore a high speed page mode write-in is possible. When changing to the y-direction, the memory access is carried out in a random mode because a page break occurs. (B) In a case where texture mapping is performed On the other hand, when the triangle is drawn with texture mapping, the operation is as follows. From the two-dimensional coordinates for the drawn pixels, pixel coordinates (u, v) corresponding to texture space (a region with a texture pattern) are obtained (reverse conversion of coordinates), and pixels corresponding to texture source space are written in. Subsequently, the degree of brightness for drawing is added with the pixels and a drawing is made in the frame memory 5. This operation is implemented at each pixel in sequence along arrow directions as shown in FIG. 4 for the entire drawing area.

However, the following two types of problems are seen in the system which uses the conventional graphic drawing processing device 100 when the texture source space is used in common with the space for drawing in the frame memory 5.

First Conventional Problem

In order to draw one pixel, the frame memory 5 must be accessed twice—once during a pair of read-out and once during write-in. This read/write access is repeated for continuous drawing. The texture space and the drawing space are set at different locations in the same memory. In addition, the texture space is not limited to sequential accessing in order to carry out coordinate conversion in the texture space and the drawing space, even with sequential accessing of the drawing space. Accordingly, when there is a read-out from the texture source space, repeated write-ins to the drawing space are carried out with random access. For example, in the case where a DRAM is used as a frame memory 5, it is not possible to use the high speed page mode and the drawing speed is markedly reduced.

Second Conventional Problem

The above-mentioned type of the first conventional problem is not produced when another memory is provided in addition to the frame memory 5 as a memory for the texture source space, but when the drawing space is accessed sequentially, access to the texture source space is random, and a DRAM cannot be used to implement high speed drawing. Therefore, a high speed SRAM is used and the cost of the total system is increased.

As outlined above, with a conventional graphic drawing device, the texture space is not limited to sequential accessing, even in the case where the drawing space is accessed sequentially, and when there is a read-out from the texture source space, repeated write-ins to the drawing space are carried out with random access, so that, for example, in the case where a DRAM is used as a frame memory, it is not possible to use the high speed page mode and the drawing speed is markedly reduced. This is a problem. Also, when another memory such as a SRAM is provided in addition to the frame memory as a memory for the texture source space, access to the texture source space is random when the drawing space is accessed sequentially, so that a DRAM cannot be used to implement high speed drawing. A high speed Static Random Access Memory (SRAM) is therefore used, so that there is the problem that the cost of the total system is increased.

SUMMARY OF THE INVENTION

Accordingly, an object of the present invention is, with due consideration to the drawbacks of such conventional graphic drawing processing devices and system, to provide graphic drawing processing device and system with a comparatively inexpensive structure whereby it is possible to perform high speed texture mapping by using a part of a frame memory emptied of texture patterns when performing texture mapping.

In accordance with a preferred aspect of the present invention, a graphic drawing processing system comprises:
a frame memory comprising:
a drawing data area for holding data for drawing on a display; and
an offscreen area for holding source data for a specified pattern which is not displayed on the display;
coordinate conversion means for obtaining pattern data corresponding to picture elements (or pixel) to be drawn, based on pattern source data in the offscreen area; and
memory means for storing one portion of the pattern source data in the offscreen area.

In accordance with yet another aspect of the present invention, a graphic drawing processing system described above, wherein
the memory means stores source data patterns corresponding to a desired area in the offscreen area of the frame memory, in graphic units,
the coordinate conversion means obtains an address for the pattern source data corresponding to all the picture elements which form the desired graphics when writing into the drawing data area of the frame memory, and
the graphic drawing processing system reads out, from the offscreen area, the desired pattern source data corresponding to all the picture elements which form the desired graphics, stores this data in the memory means, and then writes the data into the drawing data area, while referring to the memory means.

In accordance with still another aspect of the present invention, a graphic drawing processing device described above, wherein the memory means comprises:
a data area for storing, in n picture element units (where n is an optional positive integer), a plurality of source data units for patterns corresponding to a desired region in the offscreen area of the frame memory; and
an address area for storing addresses in the frame memory for data corresponding to the data area,
the coordinate conversion means obtains an address for the pattern source data corresponding to the picture elements when writing into the drawing data area of the frame memory, and
the graphic drawing processing system comprises:
comparison means for comparing the address obtained from the coordinate conversion means with the address of the address area in the memory means, and
wherein a picture element is read out of the memory means and is drawn from the results of the comparison by the comparison means, when the desired pattern source data is in the memory means, and a picture element is read out of the offscreen area and is drawn, when no desired pattern source data is in the memory means, and the contents which are read out are stored in memory means.

In accordance with still another aspect of the present invention, a graphic drawing processing system described above,
wherein the memory means comprises:
a plurality of data areas for storing source data patterns corresponding to a desired region in the off-screen area of the frame memory in n picture element units (where n is an optional integer); and
an address area for storing addresses in the frame memory for data corresponding to the data area,
the coordinate conversion means obtains an address for the pattern source data corresponding to the picture elements when writing into the drawing data area of the frame memory,
the graphic drawing processing system comprises:
comparison means for comparing the address of the pattern source data corresponding to all the picture elements which form the desired graphics obtained from the coordinate conversion means, with the address of the address area in the memory means,
and when the desired pattern source data corresponding to the picture elements for forming the desired graphics is in the memory means, the pattern source data is read out of the memory means as the result of the comparison by the comparison means, and
when the desired pattern source data is not in the memory means, the pattern source data is read out of the offscreen area and is stored in the memory means, and, after the desired pattern source data for all the picture elements for forming the desired graphics is stored in the memory means, this pattern source data is written into the drawing data area while referring to the memory means.

In accordance with till another aspect of the present invention, a graphic drawing processing system described above,
wherein the read-out of the pattern source data from the offscreen area in the frame memory and the write-in of the pattern source data to the memory means is performed in n picture element units.

In accordance with till another aspect of the present invention, a graphic drawing processing system described above,
wherein the memory means is made up of memories associated in m ways (where m is an integer, 2 or greater);
the graphic drawing processing device has a selection means for selecting the output from the pattern source data corresponding to a common address, from the results of the comparison by the comparison means.

In accordance with still another aspect of the present invention, a graphic drawing processing device described above, wherein the frame memory is formed from a plurality of banks and is controlled by an interleaved control method whereby the pattern source data inside each bank is accessed alternately.

In accordance with still another aspect of the present invention, a graphic drawing processing device described above, wherein the graphic drawing processing system further has a digital differential analysis means for calculating paint-out with colors, and for making regional decisions.

In accordance with still another aspect of the present invention, a graphic drawing processing device described above, wherein the graphic drawing processing system has a color look-up table for expressing the pattern source data in the offscreen area of the frame memory as an index color of a number of bits smaller than the a number of bits of frame data used for display.

In accordance with still another aspect of the present invention, a graphic drawing processing device described above, wherein table data of a plurality of types for storing in the color look-up table is stored in the offscreen area of the frame memory, and the graphic drawing processing system reads out the desired table data from the offscreen area and rewrites this data in the color look-up table, as required.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
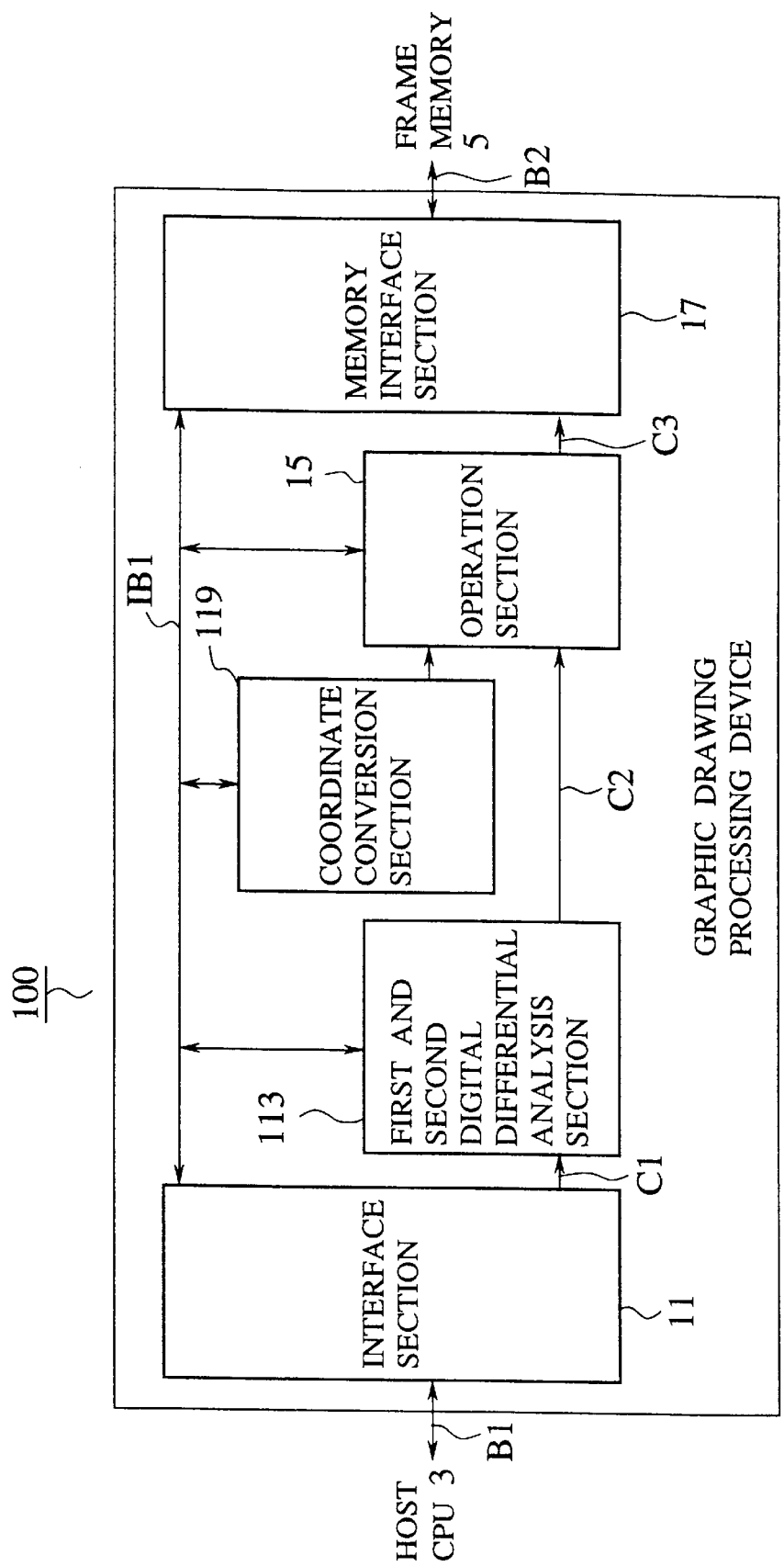
FIG. 1 is a configuration drawing of a graphic drawing processing device used in a conventional graphic drawing system.

Other features of this invention will become apparent in the course of the following description of exemplary embodiments which are given for illustration of the invention and are not intended to be limiting thereof.

Preferred embodiments of the present invention will now be explained with reference to the drawings. In the drawings, like reference numerals designate identical or corresponding parts.

First Embodiment

Figure 5:
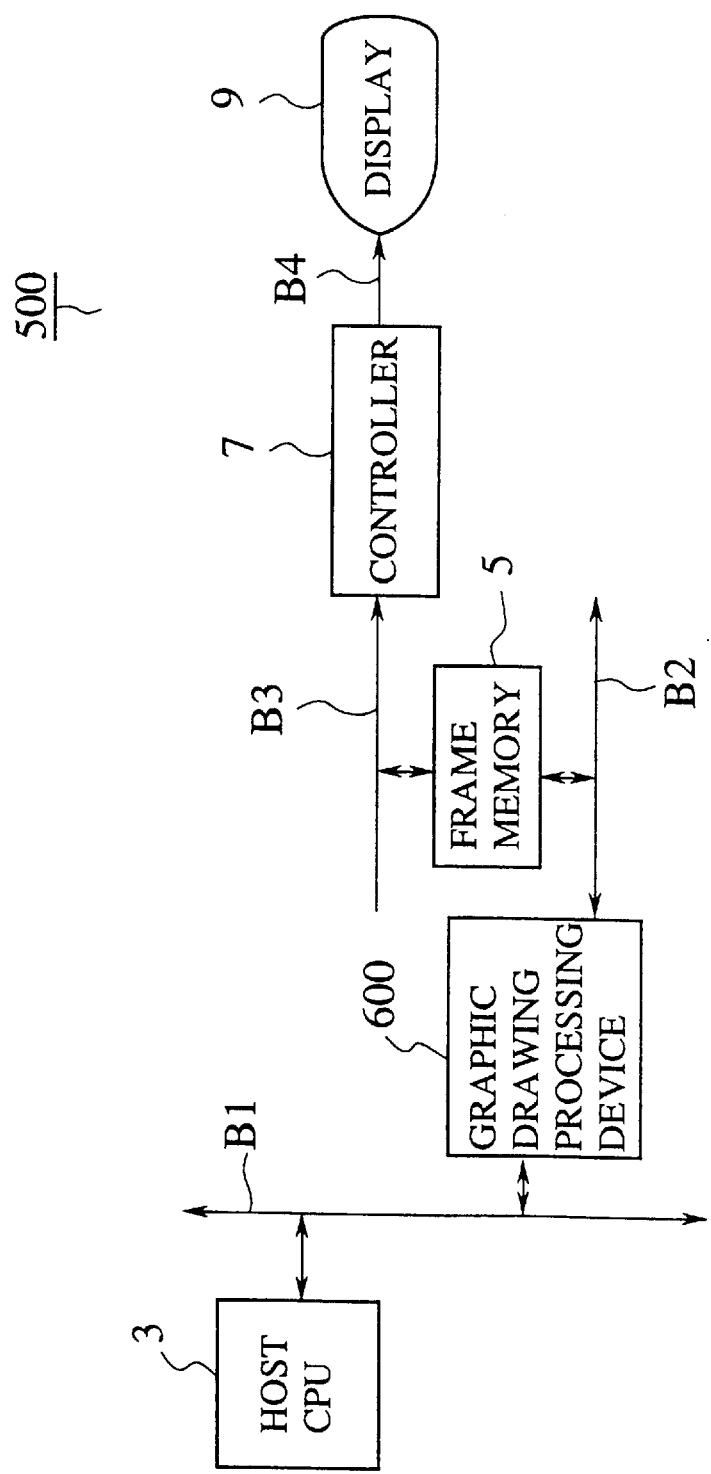
FIG. 5 is a general configuration drawing of a graphic drawing processing system according to the present invention.

FIG. 5 is a configuration drawing of a first embodiment of a graphic drawing processing system 500 of the present invention.

In FIG. 5, the graphic drawing processing system 500 has a graphic drawing processing device or processor 600, a host CPU 3 for controlling the graphic drawing processing device 600, a display 9 for displaying the graphics, a frame memory 5 made up of a drawing data area for storing data which is drawn on the display 9 together with an offscreen area for storing source data for specified patterns (texture pattern data) which are not displayed on the display 9, and a CRT controller 7 for controlling the display on the display 9.

In the FIG. 5, B1, B2, B3, and B4 are buses for transmitting data, address data, control data, and the like.

Figure 6:
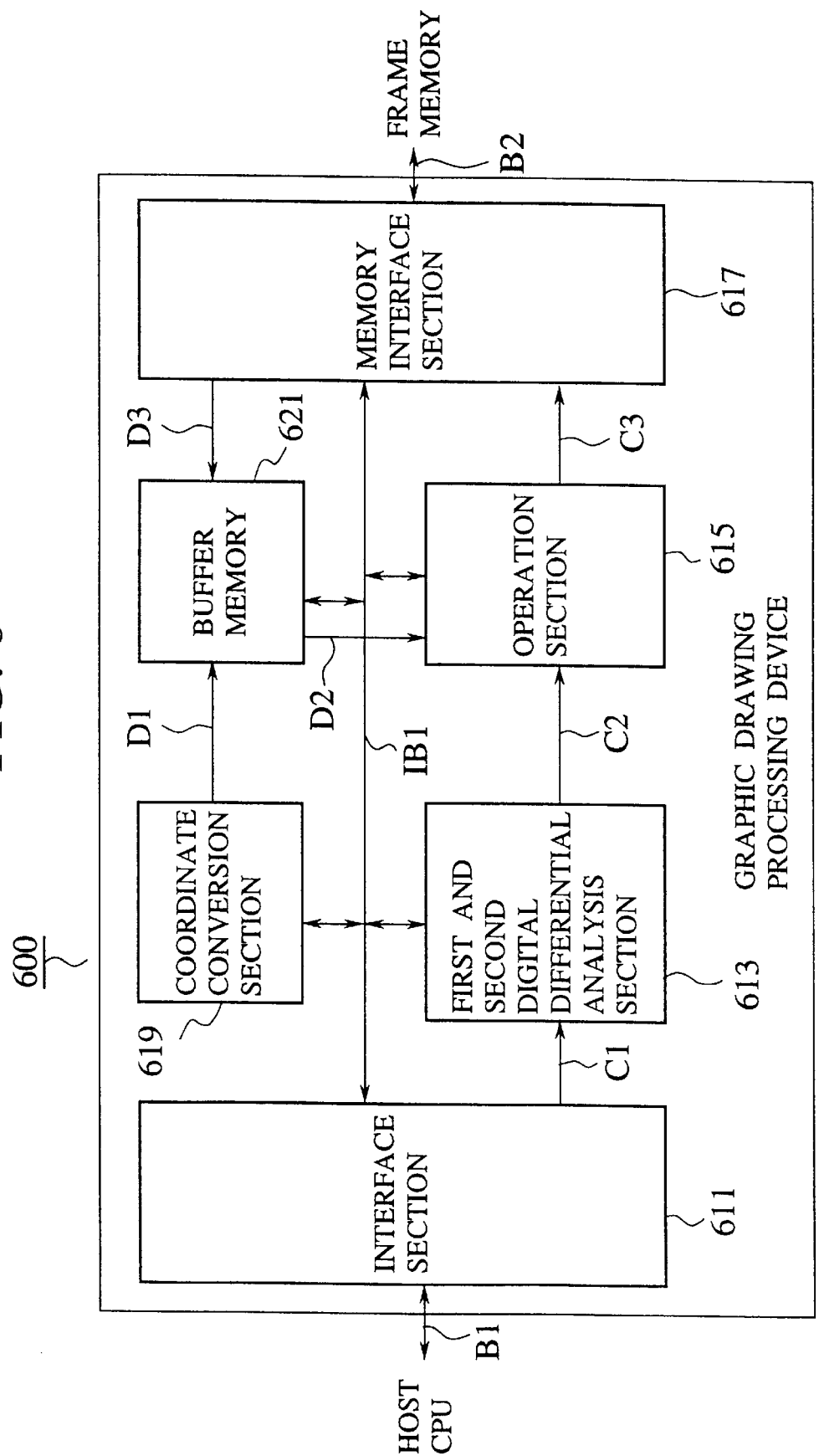
FIG. 6 is a configuration drawing of a graphic drawing processing device or processor as a first embodiment used in a graphic drawing processing system shown in FIG. 1 according to the present invention.

FIG. 6 is a configuration drawing of the graphic drawing processing device 600. As shown in FIG. 6, the graphic drawing processing device 600 has an interface section 611 for interfacing with the host CPU 3, a first and second digital differential analysis (DDA) section 613 (the first differential analysis section for calculating paint-out with colors and the second digital differential analysis section for making regional decisions), an operation section 615 for carrying out pixel unit operations, a memory interface section 617 for controlling the frame memory 5, and a coordinate conversion section 619 for converting from coordinates in a drawing space to coordinates in a source space for texture patterns, specifically, for obtaining pattern data corresponding to picture elements which are drawn based on pattern source data in the offscreen area of the frame memory 5, in addition to a buffer memory 621 for storing, in graphic units, source data for one part of the texture patterns in the offscreen area in the frame memory 5. Further, in the drawing, IB1 is an internal bus for transmitting data, address data, control data, and the like, C1, C2, and C3 are a group of control signal lines, and D1, D2, and D3 are data transmission channels.

Figure 2:
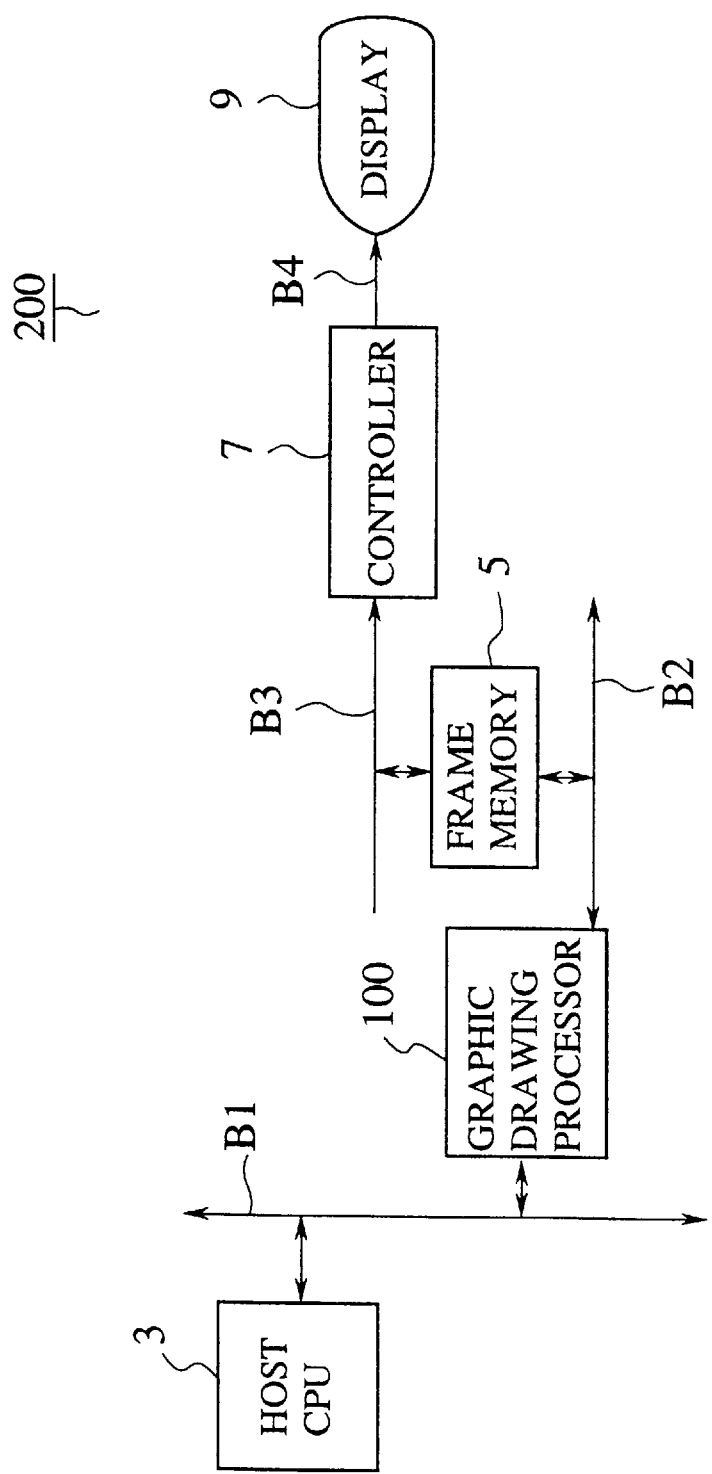
FIG. 2 is a general configuration drawing of a conventional graphic drawing system.
Figure 3:
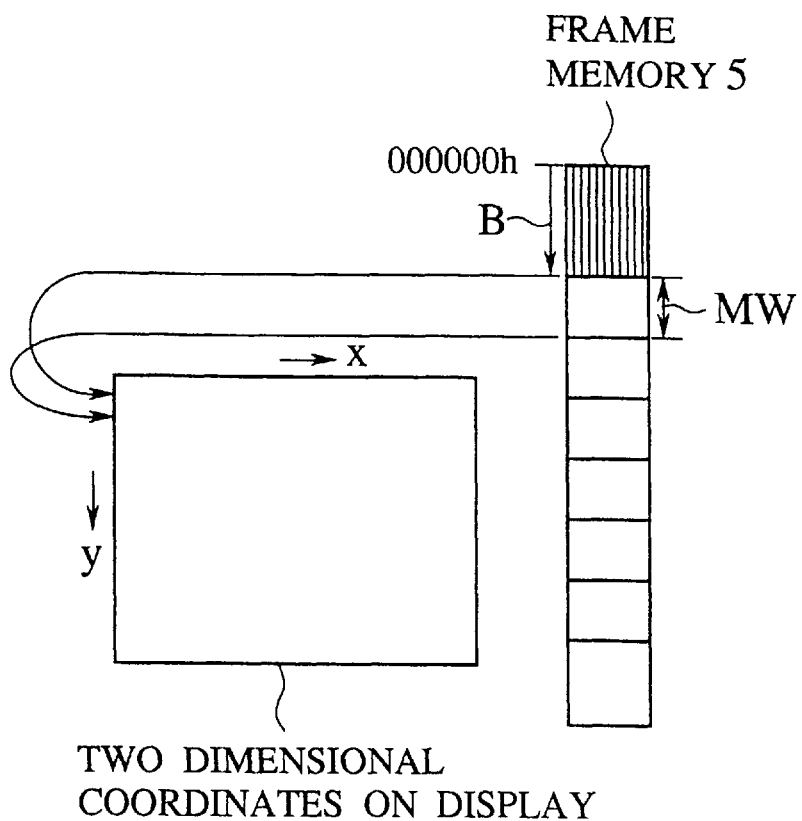
FIG. 3 is a drawing for explaining the relationship between two dimensional coordinates on a display and a frame memory.
Figure 4:
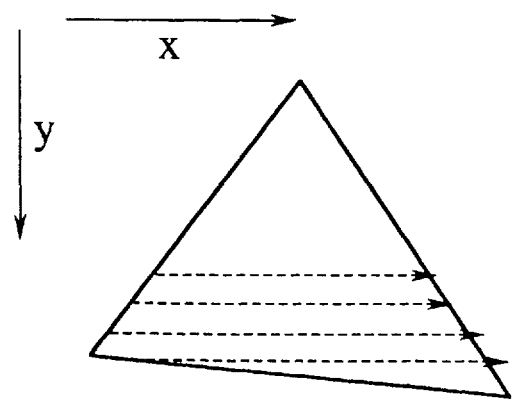
FIG. 4 is a drawing for explaining the drawing method for a graphic drawing processing device.

In the first embodiment of the graphic drawing processing system 500, the operation in the case where texture mapping is not carried out is the same operation as in the conventional example, for example as shown in FIGS. 1 and 2. However, the drawing operation when drawing a polygon (for example, a triangle) while performing texture mapping, and texture patterning a pattern in the offscreen area in the frame memory 5, is as follows.

First, the coordinate conversion section 619 assigns in advance a range of data in the frame memory 5 used for the next polygon to be drawn, and texture source patterns are grouped in the range assigned prior to starting to draw the polygon, read out of the offscreen area in the frame memory 5, and stored in the buffer memory 621.

During the drawing of the polygon (during the write-in to the drawing data area of the frame memory 5), all the texture patterns to be used are in the buffer memory 621, therefore, in using such the texture patterns, the frame data obtained from the first and second digital differential analysis section 613 is multiplied by the texture pattern, and the result is written into the drawing data area of the frame memory 5.

Figure 7:
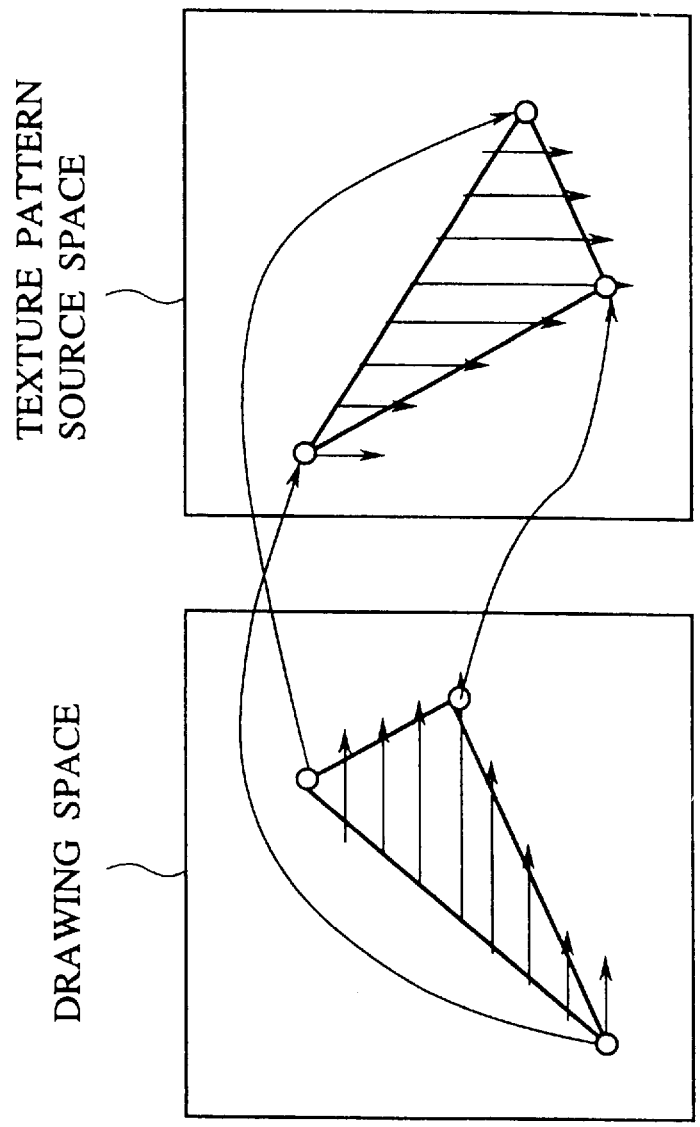
FIG. 7 is a drawing for explaining the correspondence between drawing space and texture source space in the present invention.
Figure 8:
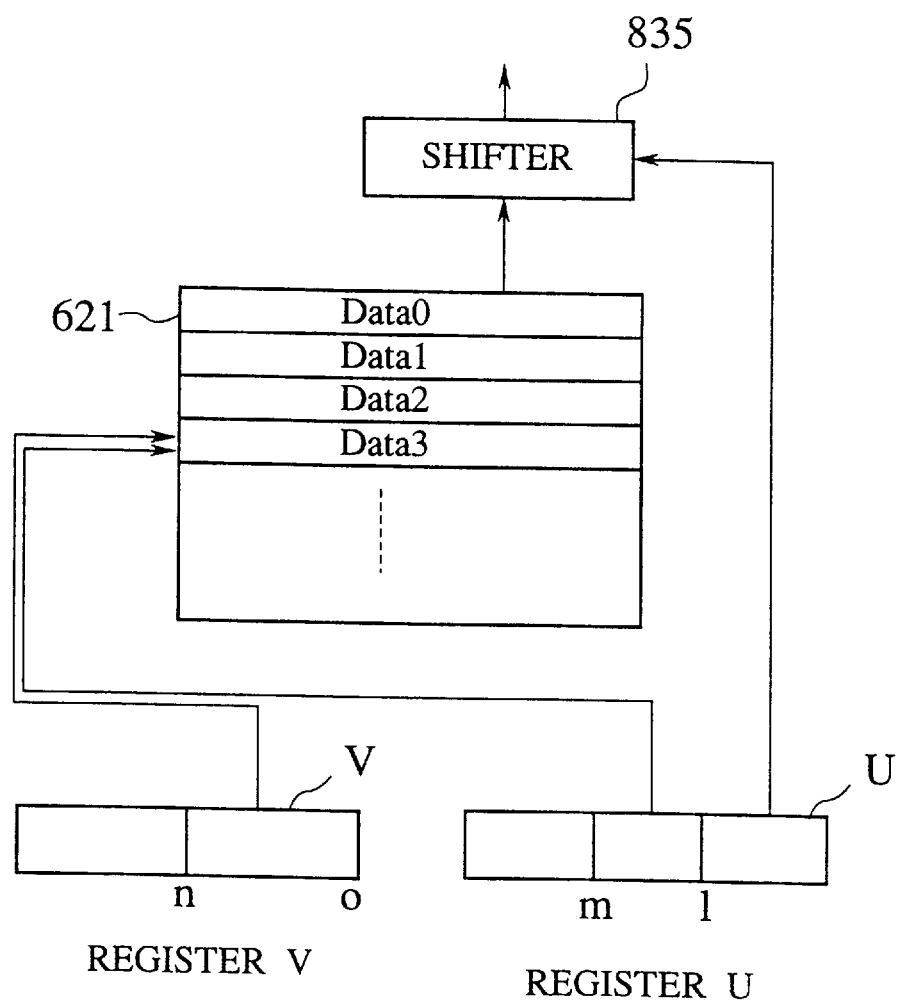
FIG. 8 is a detailed configuration drawing of a buffer memory in the graphic drawing processing device according to the first embodiment as shown in FIG. 6.

FIG. 7 shows the relationship between drawing space and texture pattern source space when making a rotary conversion or the like. The buffer memory 621 has a configuration as shown in FIG. 8. When the coordinates for the texture pattern source space are (u, v), the processing device includes a register V in which the coordinate v is stored, a register U in which the coordinate u is stored, the buffer memory 621, and a shifter 835.

The buffer memory 521 has a memory structure with an address connecting the bits from the (m+1)st bit to the (l+1)st bit (u [m+1:l+1]), counting from the Lowest Significant Bit (LSB) of the register U, and the bits from the nth bit to the 0th bit of the register V (v [n:0]), and has a block length of 2l with 2m+n entries. Specifically, in the case of the buffer memory 521 with the configuration shown in FIG. 8, it is possible to have simultaneous frame data as a chain of (2m+1) pixels in the u direction and 2n pixels in the v direction.

As outlined above, with this embodiment, in a graphic system for performing texture mapping, for example, in the case where a Dynamic Random Access Memory (DRAM) is used as the frame memory 5, it is possible to carry out texture mapping at high speed using high speed page mode during a drawing operation with a unused area in the frame memory 5 for a texture pattern.

Second Embodiment

Figure 9:
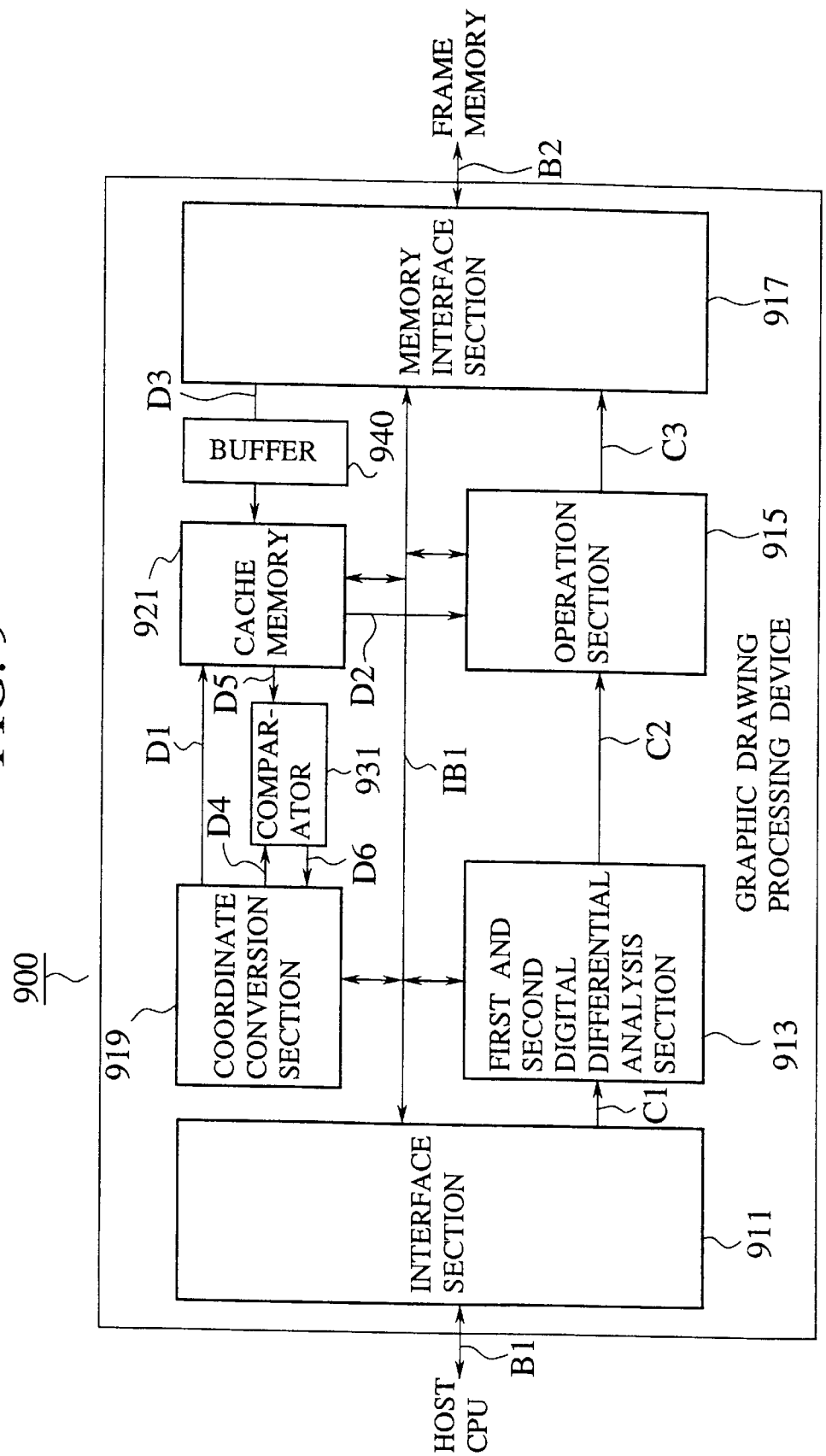
FIG. 9 is a configuration drawing of a graphic drawing processing device or processor in a second embodiment used in a graphic drawing processing system according to the present invention.

Next, FIG. 9 is a configuration drawing of a graphic drawing processing device 900 used in a graphic drawing processing system as the second preferred embodiment of the present invention.

Further, the total configuration of the second embodiment of the graphic drawing processing system of the present invention is shown in FIG. 5, in the same manner as for the first embodiment.

As shown in FIG. 9, the graphic drawing processing device 900 has an interface section 911 for interfacing with the host CPU 3, a first and second digital differential analysis (DDA) section 913 (the first differential analysis section for calculating paint-out with colors and the second digital differential analysis section for making regional decisions), an operation section 915 for carrying out pixel unit operations, a memory interface section 917 for controlling the frame memory 5, a coordinate conversion section 919 for converting from coordinates in a drawing space to coordinates in a source space for texture patterns, a cache memory 921 for storing, in graphic units, source data for one part of the texture patterns in the offscreen area in the frame memory 5, and a comparator 931. Further, as shown in FIG. 9, IB1 is an internal bus for transmitting data, address data, control data, and the like, C1, C2, and C3 are a group of control signal lines, and D1 to D6 are data transmission channels.

The cache memory 921 has a data area for storing, in n picture element units (where n is an optional positive integer), a plurality of source data units for patterns stored in a desired region in the offscreen area in the frame memory 5, and a tag area for storing addresses in the frame memory 5 for the data corresponding to the data area.

The comparator 931 compares the address of the pattern source data corresponding to all the picture elements which form the desired graphics obtained by the coordinate conversion means 919 with the address of the tag area in the cache memory 921.

In a graphic drawing processing system including the graphic drawing processor 900 of the second embodiment of the present invention, the operation in the case where texture mapping is not carried out is the same operation as in the conventional example. However, in the case where graphic drawing is carried out while performing texture mapping, the drawing operation is as follows.

The sequence in which the pixels are drawn is the same as in the case in which texture mapping is not carried out. Converting from the coordinates for the drawing space wherein the pixels are drawn, to coordinates for the source space for the texture patterns using the coordinate conversion section 919, the addresses of the tag area in the cache memory 921 is checked by the comparator 931. In the case of a cache hit, namely, the read operation is a hit, the value in the cache memory 921 is used, in the case of a cache miss, namely, the read operation is a miss, the value is read out of the frame memory 5. At this time, only the pixels continuing for the block length portion of the cache memory 921 are read out. After all the texture patterns used are stored in the cache memory 921, during graphic drawing (during the write-in to the drawing data area of the frame memory 5), using these texture patterns, the frame data obtained from the first and second digital differential analysis sections 913 is multiplied by the texture pattern, in the operation section 915 for carrying out pixel unit operations; and the result is written into the drawing data area of the frame memory 5.

Figure 10:
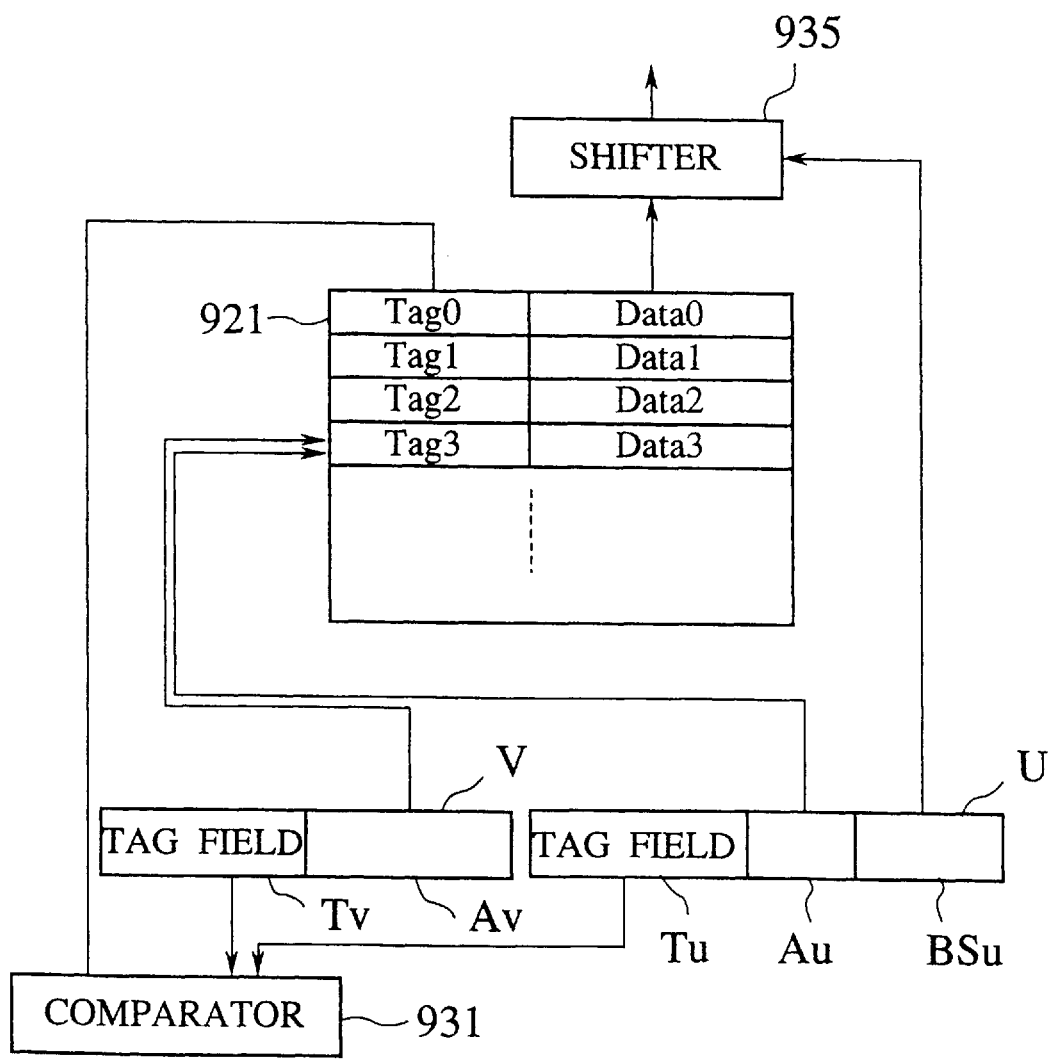
FIG. 10 is a detailed configuration drawing of a cache memory used in the graphic drawing processing device of the second embodiment as shown in FIG. 9.

FIG. 10 is a detailed configuration drawing for the cache memory 921 and the comparator 931 in the graphic drawing processor 900 of this embodiment.

When the coordinates for the texture pattern source space are (u, v), this system has a register V in which the coordinate v is stored, a register U in which the coordinate u is stored, the cache memory 921, the comparator 931, and a shifter 935.

The cache memory 921 is a cache memory structure for direct mapping, connecting the bits from the (m+1)st bit to the (l+1)st bit (u [m+1:l+1]), counting from the Lowest Significant Bit (LSB) of the register U, to the bits from the nth bit to the 0th bit of the register V (v [n:0]), as the address of the cache memory 921 having a block length of 2l with 2m+n entries. In addition, unused bits in the upper order portions of the register U and the register V are used as a tag for each entry. In the case of the cache memory 921 with this configuration, it is possible to have simultaneous frame data as a chain of 2m+1 pixels in the u direction and 2n pixels in the v direction.

When texture mapping is carried out using the cache memory 921 with this type of configuration, the operation of this embodiment is as follows.

After the coordinates are converted and the coordinates (u, v) in the texture pattern source space are obtained by the coordinate conversion section 919, with (u [m+1:l+1]), and (v [n:0]) as the address of the cache memory 921, a read access is performed for the cache memory 921. The texture pattern data and tag data are read out and the tag data is compared with the upper order of the register U and the register V using the comparator 931. At this time, when the tags are in agreement, the data in the cache register 921 is used as texture pattern data. When the tags are not in agreement, only the texture pattern source data of the block length (2l) is read out from the frame memory 5 and stored in the cache memory 921.

After the texture pattern data is provided in this manner, the frame data obtained by the first and second digital differential analysis section 913 is multiplied with the texture pattern and the result is written into the drawing data area in the frame memory 5.

As outlined above, with this embodiment, in a graphic system for performing texture mapping, for example, in the case where a DRAM is used as the frame memory 5, it is possible to carry out texture mapping at high speed using high speed page mode during a drawing operation using a section outside of the frame memory 5 for a texture pattern.

In addition, in the case of the embodiment of the present invention during texture mapping, when one polygon (for example, a triangle) is to be drawn, prior to drawing the polygon, a decision is made by a comparison of the tag data as to whether or not the texture mapping source data to be used is contained in the cache memory 921. If not contained, the texture pattern data in the offscreen area is read out and stored in the cache memory 921. If the texture mapping source data is already contained in the cache memory 921, there is no such read out, and after all the texture pattern data for the one polygon has been provided to the cache memory 921, the polygon is drawn.

Specifically, first, a range of a texture pattern data used for the next polygon to be drawn is assigned in advance in the coordinate conversion section 919, and during the drawing of the previous polygon, a check is made to see whether or not the next texture pattern data to be drawn exists in the cache memory 921. If not exist, texture pattern data is read from the offscreen area in the frame memory 5 and stored to the cache memory 921 before drawing it.

During the drawing of the polygon, all the texture patterns to be used are in the cache memory 921. Therefore, using these texture patterns, the frame data obtained from the first and second digital differential analysis section 913 is multiplied by the texture pattern and the result is written into the drawing data area of the frame memory 5.

In order to perform the preceding read-out operation for the above-mentioned texture pattern data efficiently, a buffer 940, as shown in FIG. 9, can be provided on the data transmission channel D3 between the cache memory 921 and the memory interface section 917. Thereby, during the drawing of the previous polygon, the texture source addresses of the texture pattern data for the range which does not exist in the cache memory 921 is temporarily stored in this buffer 940, and after the drawing of the previous polygon is completed, it is possible to implement the drawing process more efficiently by transmitting the texture pattern in the frame memory to the cache memory 921 in one bundle based on the texture source addresses in the duffer 940.

Third Embodiment

Figure 11:
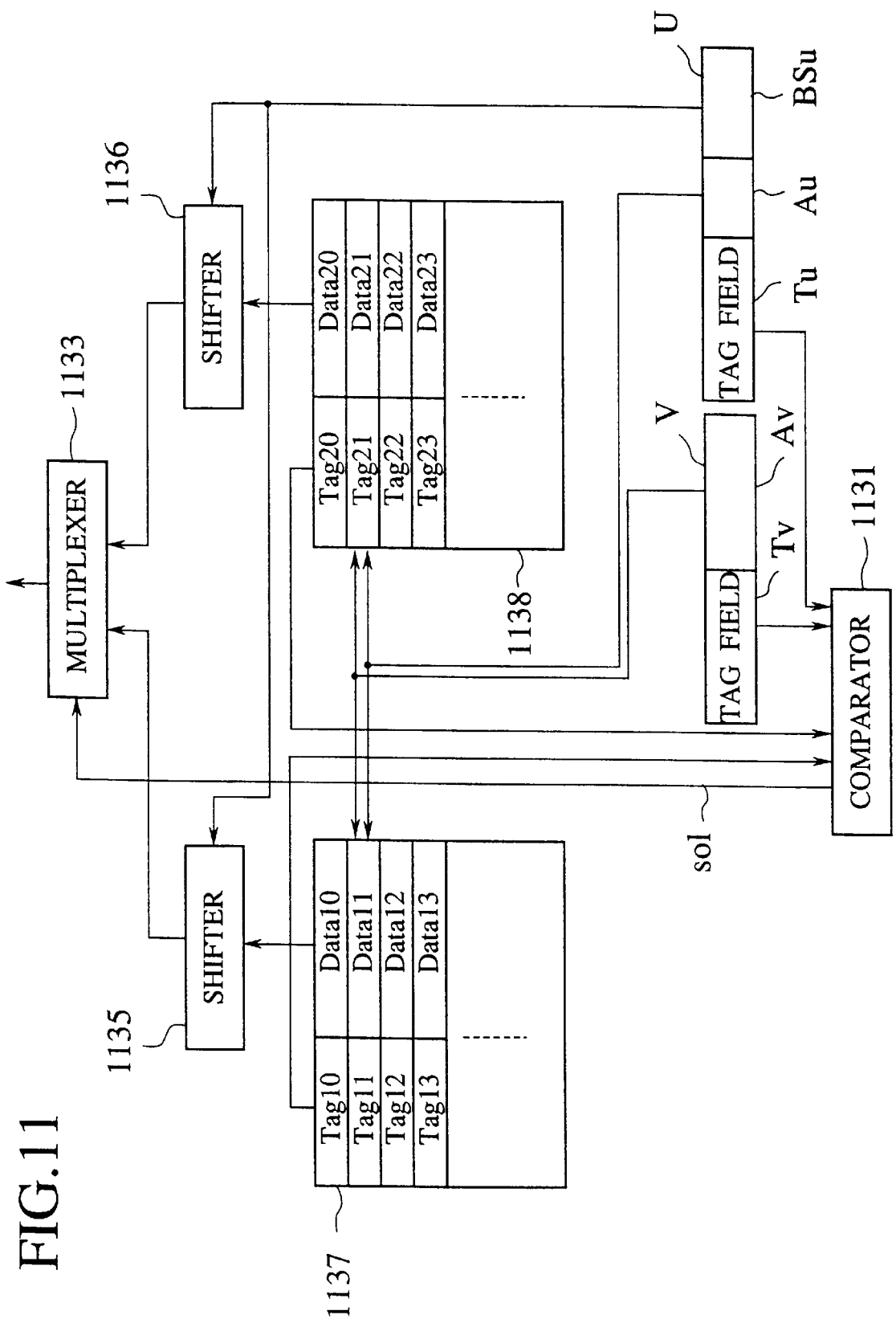
FIG. 11 is a detailed configuration drawing of a cache memory used for a graphic drawing processing device as a third embodiment of a graphic drawing processing device of the present invention.

FIG. 11 is a configuration drawing of a cache memory and a comparator included in a graphic drawing processing device of the third embodiment according to the present invention.

The total configuration of this embodiment of the graphic drawing processing system and the configuration of the graphic drawing processing device of the present invention are shown in FIG. 5 and FIG. 9, in the same manner as for the second embodiment. Therefore the total configuration drawings of the graphic drawing processing device and system are omitted. The difference is only the configuration of the cache memory 1137, 1138, the multiplexer 1133, and the comparator 1131.

In FIG. 11, the cache memory 1137, 1138 of this embodiment has a two-way configuration. When the coordinates of the texture pattern source space are (u, v), the system for the cache memory and the comparator have a register V in which the coordinate v is stored, a register U in which the coordinate u is stored, a pair of cache memories 1137 and 1138, the comparator 1131, a pair of shifters 1135 and 1136, and a multiplexer 1133 for selecting the output.

The cache memories 1137 and 1138 have configurations which are the same as that for the cache memory 921 in the graphic drawing processing device 900 as the second embodiment of the present invention.

In the third embodiment of the graphic drawing processing device having the configuration feature of the cache memories 1137 and 1138, comparator 1131, the multiplexer 1133, and the shifters 1135 and 1136, the drawing operation when drawing a polygon (for example, a triangle) while performing texture mapping is as follows. In the same manner as in the second embodiment, the coordinates for the drawing space wherein the pixels are drawn are converted to coordinates for the source space for the texture patterns, using the coordinate conversion section 919. The tag data is then compared with the outputs of the cache memory 1137 and the cache memory 1138 respectively using the comparator 931. Whichever of the cache memory outputs is in agreement with the tag data then becomes the output. When there is a cache miss (the read operation is a miss) in either of these cache memories, the texture pattern data is read out of the frame memory 5 and stored in either one of the cache memories 1137 and 1138. After all the texture patterns to be used are stored in the cache memory 921, the operation section 915 for carrying out pixel unit operations multiplies the frame data obtained from the first and second digital differential analysis section 913 by the texture pattern, using these texture patterns, during the drawing of the polygon (during the write-in to the drawing data area of the frame memory 5), and the result is written into the drawing data area of the frame memory 5. In the third embodiment, it is possible to perform high speed texture mapping in the same manner as in the first and second embodiments, as shown in FIGS. 5, 6, and 9, and, at the same time, it is possible to increase a degree of freedom of the texture mapping operation by the configuration of the cache memories 1137 and 1138.

Fourth Embodiment

Figure 12:
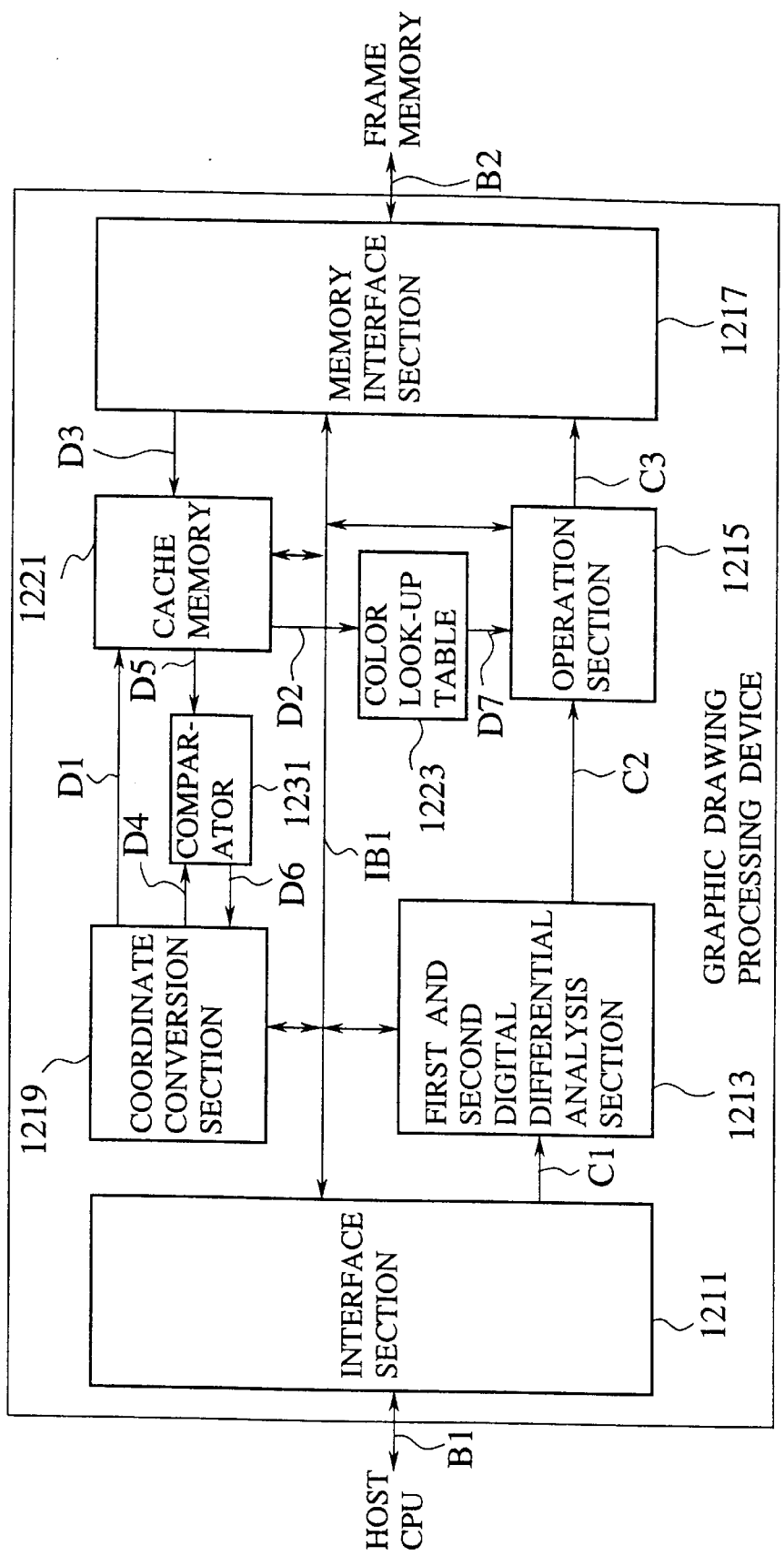
FIG. 12 is a configuration drawing of a graphic drawing processing device or processor as a fourth embodiment used in a graphic drawing processing system according to the present invention.

FIG. 12 is a configuration drawing of a graphic drawing processor 1200 in a fourth embodiment of the present invention. Further, the total configuration of a graphic drawing processing system including the graphic drawing processor 1200 of the fourth embodiment is the same as for the graphic drawing processing system 500 shown in FIG. 5.

As shown in FIG. 12, the graphic drawing processor 1200 has an interface section 1211 for interfacing with the host CPU 3, a first and second digital differential analysis (DDA) section 1213 (the first differential analysis section for calculating paint-out with colors and the second digital differential analysis section for making regional decisions), an operation section 1215 for carrying out pixel unit operations, a memory interface section 1217 for controlling the frame memory 5, a coordinate conversion section 1219 for converting from coordinates in a drawing space to coordinates in a source space for texture patterns, a cache memory 1221 for storing, in graphic units, source data for one portion of the texture patterns in the offscreen area in the frame memory 5, a comparator 1231, and a color look-up table 1223 for converting texture pattern data. Further, in this drawing, IB1 is an internal bus for transmitting data, address data, control data, and the like, C1, C2, and C3 are a group of control signal lines, and D1 to D7 are data transmission channels.

The display section of the display 9 is made up of Xmax×Ymax pixels. One pixel is displayed in "a" bits for R (red), G (green), and B (blue). A multiport DRAM (dual port Dynamic Random Access Memory or Video RAM (VRAM)) is used in the frame memory 5. An address is assigned to each pixel in the frame memory 5, and the frame memory 5 is accessed in one pixel units. The relationship between the display coordinates and an address 'address' of the frame memory 5 is represented by the following equation $$address = x + y \times Xmax \qquad (2).$$

The texture pattern is defined by the source space coordinates (u, v) for a texture pattern of 2nu×2 nv characteristics in each pattern, and is set in the offscreen area of the frame memory 5. The texture pattern is displayed in c bits for each pixel (c=a/k, where k is an integer), and the bits are extended by the color look-up table 1223 within the graphic drawing processing device 1200. Specifically, a maximum of 2c colors can be displayed in this manner. The address of the frame memory 5 is related to a base address 'base' in each of the various spaces and is defined by the following equation, $$address = base + [u/k] + v \times Umax/k \qquad (3).$$

Figure 13:
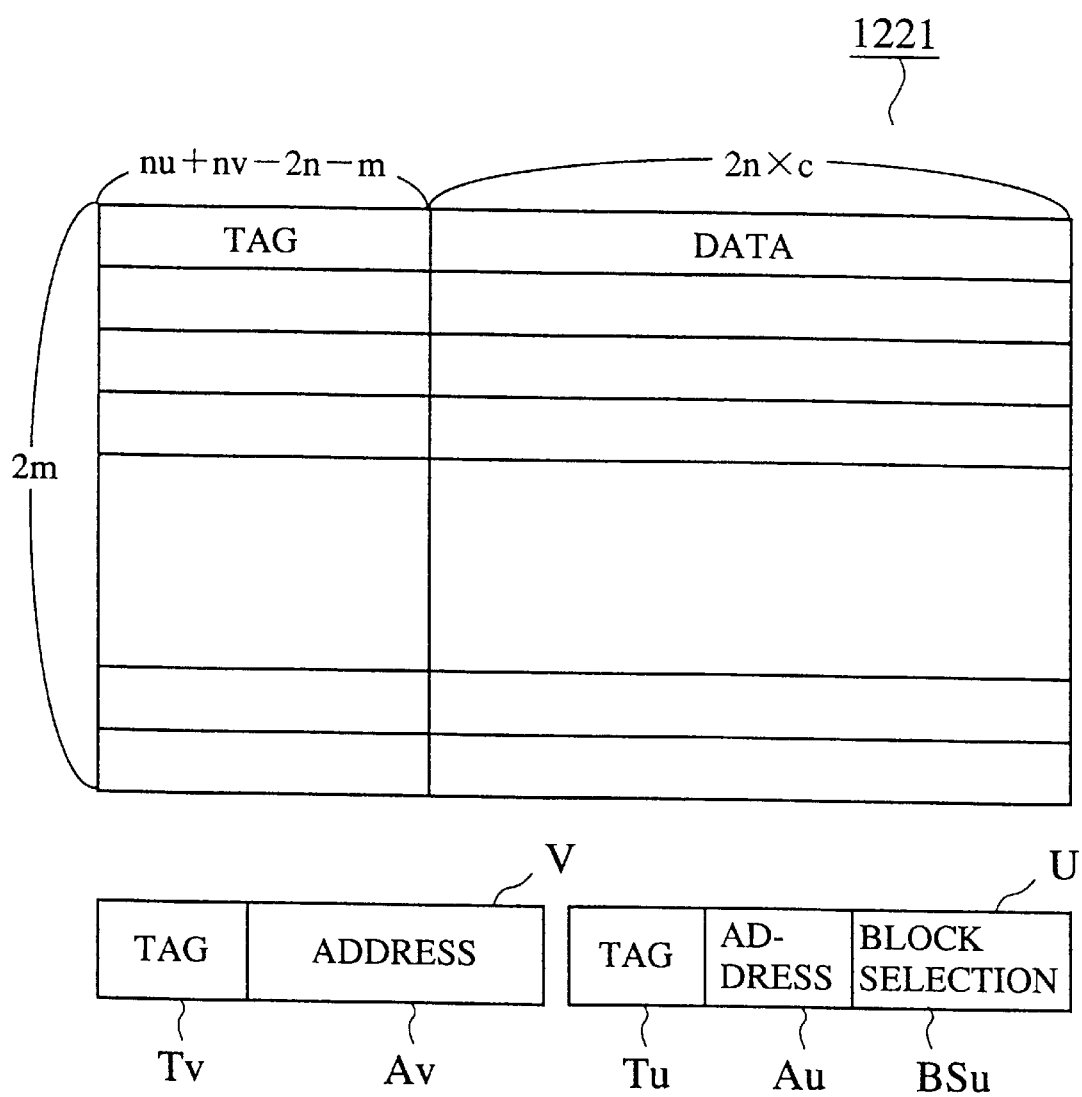
FIG. 13 is a drawing for explaining a cache memory in the graphic drawing processing device of the fourth embodiment shown in FIG. 12.

The configuration of the cache memory 1221 of this embodiment is shown in FIG. 13. The block length is 2n pixels, and there is a tag area of nu- nv -2n -m bits with 2m entries. Also, it is possible to have mu pixels in sequence in the u direction and mv pixels in sequence in the v direction, in the cache memory 1221 simultaneously.

Next, an operation where a polygon (for example, a triangle) is drawn with accompanying texture mapping will be explained for this embodiment of the graphic drawing processing device of the present invention. From coordinates (x, y) of a pixel to be currently drawn, the coordinates (u, v) of a pixel in the texture source space corresponding to this pixel are obtained by the coordinate conversion section 1219. An address Au, Av, and a tag Tu, Tv, together with a block selection signal BSu for selecting which data in one entry is to be used, are created from these coordinates (u, v). These are set in the registers U and V. The address Au, Av is output to the cache memory 121, the tag Tu, Tv is output to the comparator 1231, and the block selection signal BSu is output to the shifter 1235. In the case where the tag data is found to be in agreement by the comparator 1231, the data from the cache memory 1221 is used without modification and is multiplied with the RGB value obtained by the first and second digital differential analysis section 1213, using the operation section 1215, and is then written into the drawing data area of the frame memory 5.

In the case where the tag data is found to be not in agreement by the comparator 1231, the first and second digital differential analysis section 1213 are halted under the current conditions and the required texture pattern data from the frame memory 5 is read out in block units, and written into the cache memory 1221 simultaneously with the tag data. The drawing by the frame memory 5 is then carried out, using this value.

FIG. 7 shows the relationship between the coordinates in the drawing space and in the texture pattern source space when making a rotary conversion or the like. Specifically, a scan is performed on the texture pattern source space, as shown in the drawing. At this time, when there is no data in the cache memory 1221, drawing is interrupted and the texture pattern data is read out. A number of pixels corresponding to the block length in the u direction is then obtained and these pixels are read out. Data not required for the current drawing is also read out, and, when all the pixels for the polygon are drawn, this is data which will probably be used. For example, in the case of FIG. 7, is used when moving to the next scan line. At this time, if there is no cache miss operation (the read operation is a miss) the drawing can be performed, and the overall drawing efficiency can be improved.

Furthermore, when the scan is normal, the cache memory 1221 may be formed extending in the v direction. The color look-up table 1223 in the graphic drawing processor 1200 is made up of 2c entries. Some of the data for conversion is provided on the offscreen area of the frame memory 5. Specifically, the color look-up table data used prior to drawing the polygon is selected, and in the case where this data differs from that incorporated in the current color look-up table, the data for the color look-up table is read out of the frame memory 5 and incorporated into the contents of the table.

In this manner, with the present embodiment the texture pattern source data is represented by a small number of bits, and the efficiency of the read-out of the texture pattern data is improved. Also, by replacing the data in the color look-up table 1223 it is possible to represent color gradations in a variety of colors.

Fifth Embodiment

Figure 14:
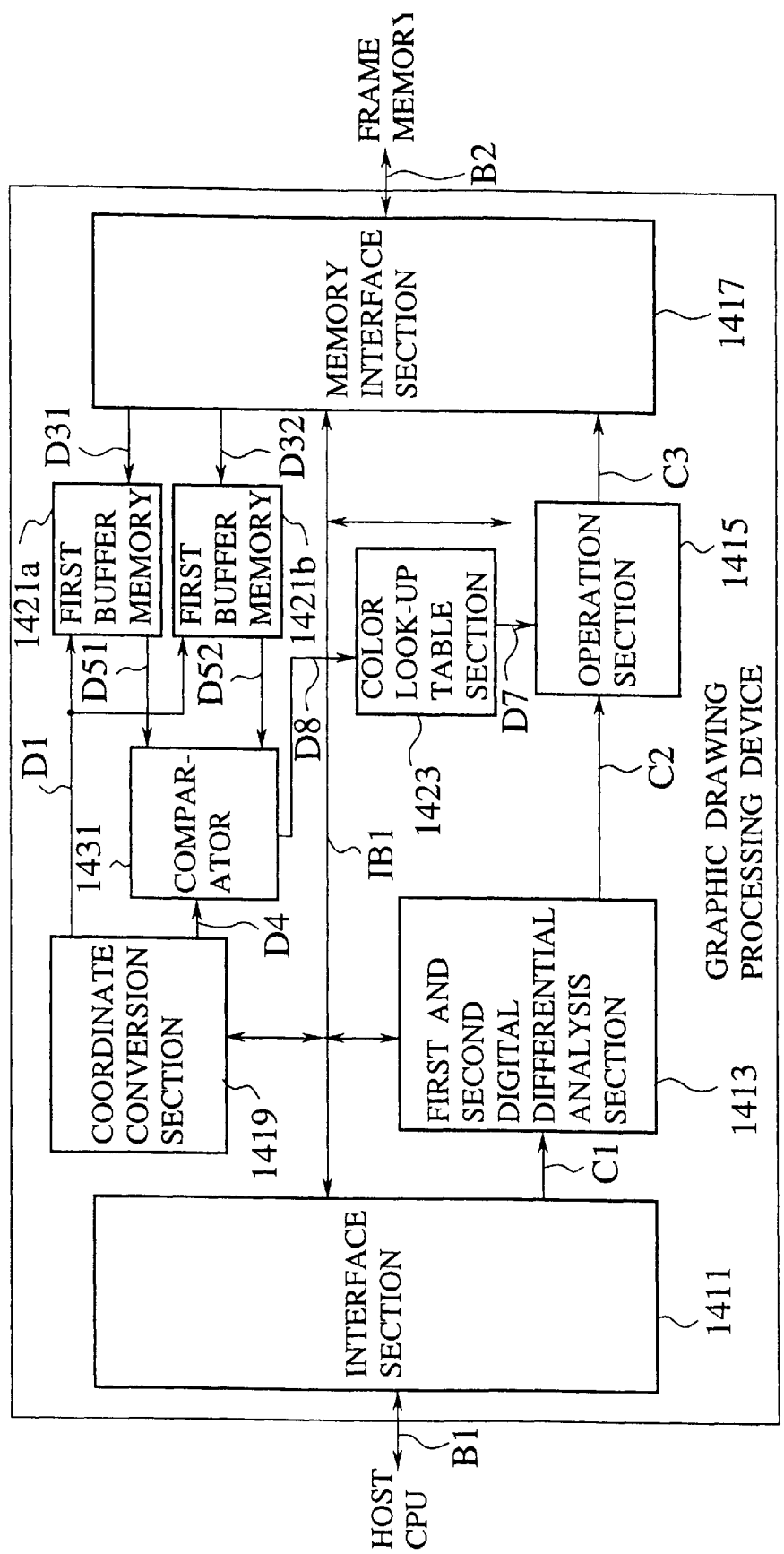
FIG. 14 is a configuration drawing of a graphic drawing processing device or processor as a fifth embodiment used in a graphic drawing processing system according to the present invention.

FIG. 14 is a configuration drawing of a graphic drawing processing device or processor 1400 used in a fifth embodiment of a graphic drawing processing system of the present invention.

Further, the total configuration of the graphic drawing processing device including the graphic drawing processing device 1400 is the same as for the graphic drawing processing device as the first embodiment shown in FIG. 5.

As shown in FIG. 14, the graphic drawing processing device 1400 includes an interface section 1411 for interfacing with the host CPU 3, first and second digital differential analysis (DDA) sections 1413 (the first differential analysis section for calculating paint-out with colors and the second digital differential analysis section for making regional decisions), an operation section 1415 for carrying out pixel unit operations, a memory interface section 1417 for controlling the frame memory 5, a coordinate conversion section 1419 for converting from coordinates in a drawing space to coordinates in a source space for texture patterns, a first buffer memory 1421*a* and a second buffer memory 1421*b* for storing, in graphic units, source data for one portion of the texture patterns in the offscreen area in the frame memory 5, a comparator 1431, and a color look-up table 1423 for converting texture pattern data. Further, in the drawing, IB1 is an internal bus for transmitting data, address data, control data, and the like, C1, C2, and C3 are a group of control signal lines, and D1 to D8 and D31 to D52 are data transmission channels.

This fifth embodiment of the graphic drawing processing device 1400 exhibits a two-way configuration for the buffer memory 1421*a* and 1421*b* instead of the buffer memory 621 of the first embodiment shown in FIG. 6.

Figure 15:
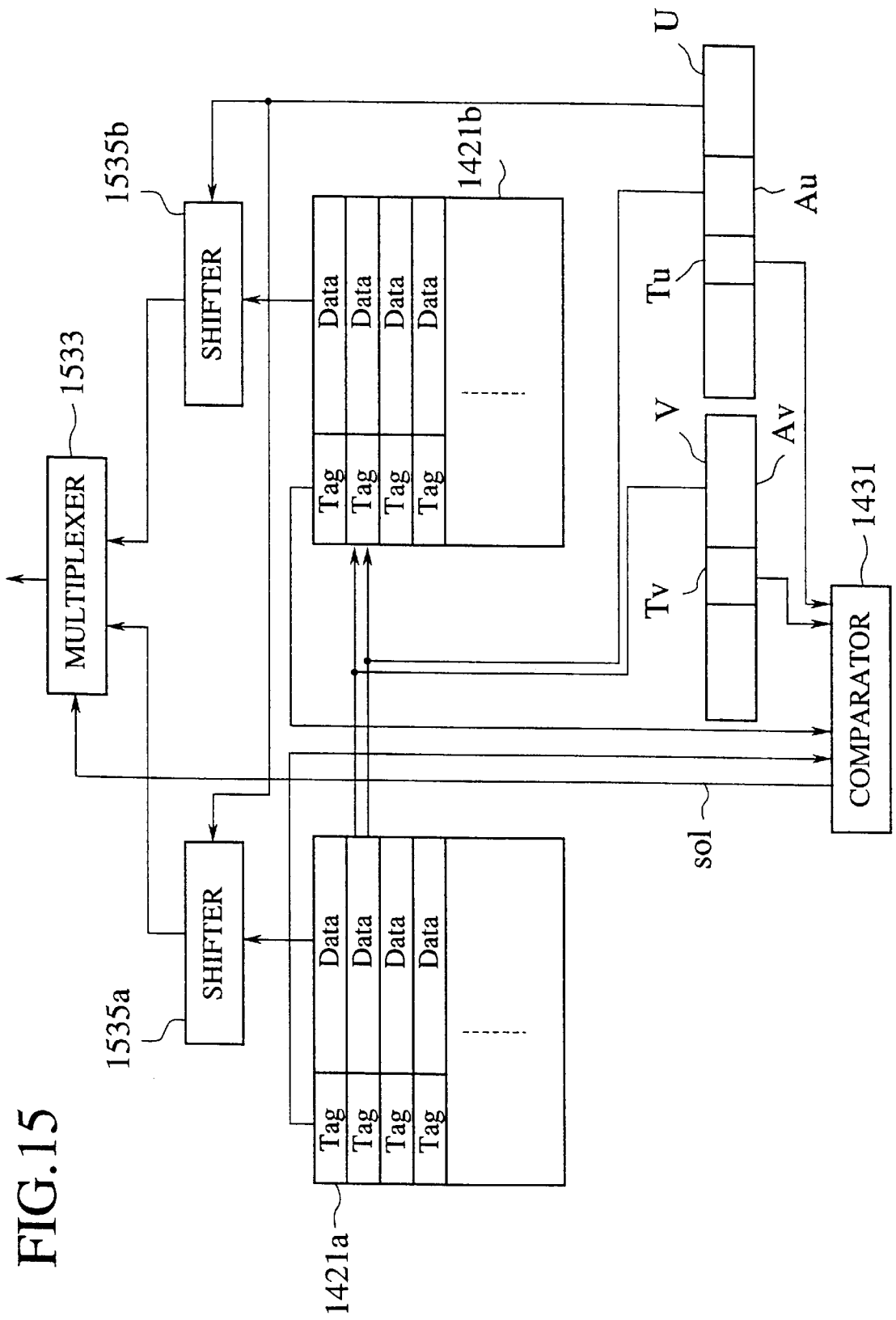
FIG. 15 is a detailed configuration drawing of a buffer memory in the graphic drawing processing device as the fifth embodiment shown in FIG. 14.

The detailed configuration is shown in FIG. 15. In FIG. 15, the buffer memory has the first buffer memory 1421*a* and the second buffer memory 1421*b*, a register V in which the coordinate v is stored and a register U in which the coordinate u is stored when the coordinates for the texture pattern source space are (u, v), a comparator 1431, a pair of shifters 1535*a* and 1535*b*, and a multiplexer 1433 for selecting the output.

Each entry to the first buffer memory 1421*a* and the second buffer memory 1421*b* respectively has a tag field of 2 bits, other than data. Specifically, a comparison of the tag data for the respective outputs of the first buffer memory 1421*a* and the second buffer memory 1421*b* is carried out, and the multiplexer 1433 selects the output which is in agreement. The drawing operation in this embodiment is the same as in the first embodiment. A detailed explanation will be given during the explanation of a later-described the seventh embodiment.

Sixth Embodiment

Figure 16:
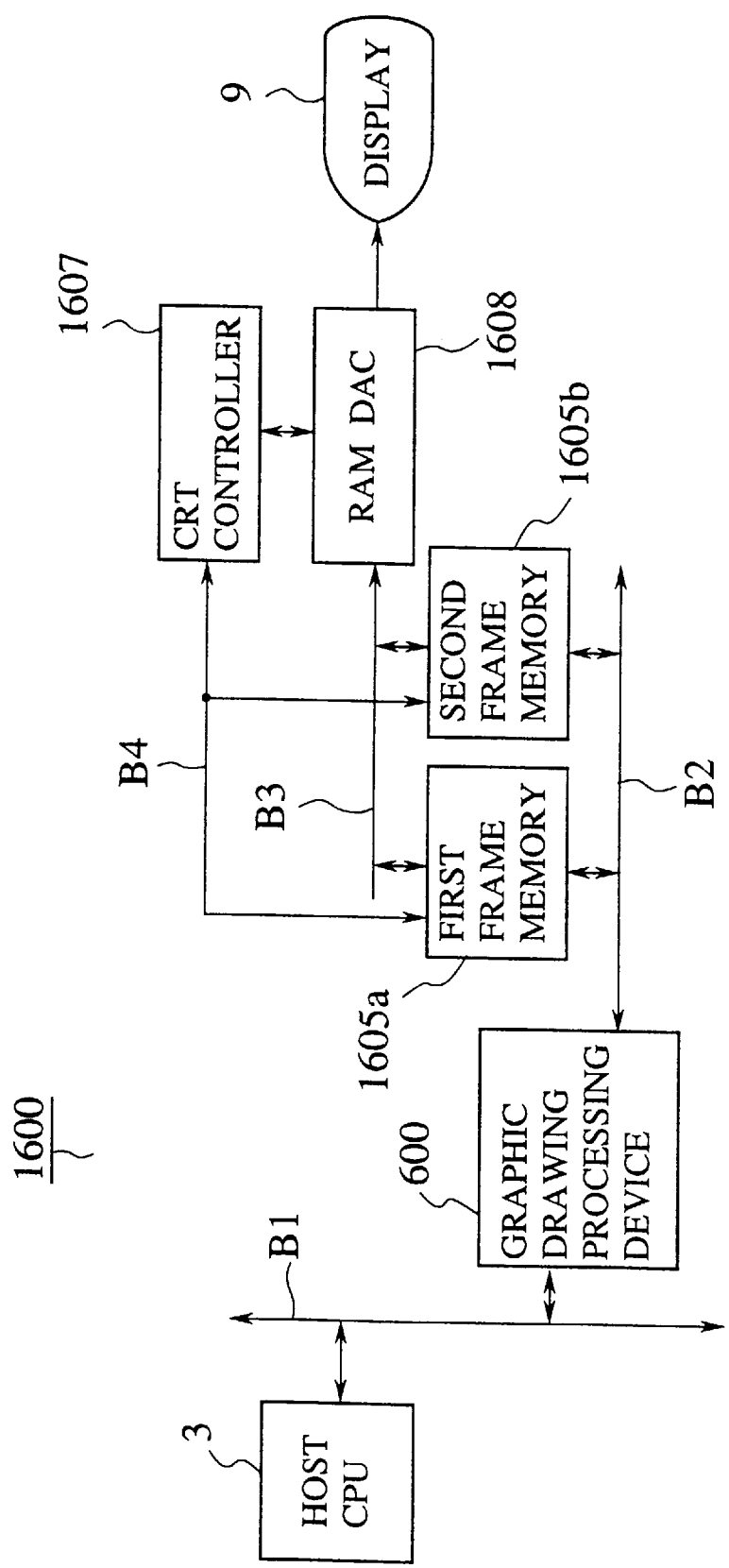
FIG. 16 is a general configuration drawing of a graphic drawing processing system as a sixth embodiment according to the present invention.

FIG. 16 is a configuration drawing of a sixth embodiment of a graphic drawing processing system 1600 of the present invention. As shown in this drawing, the graphic drawing processing system 1600 has a graphic drawing processing device 600 as the first embodiment of the present invention, a host CPU 3 for controlling the graphic drawing processing device 600, an interface section 11 for interfacing with the host CPU 3, a display 9 for displaying the graphics, a first frame memory 1605*a* and a second frame memory 1605*b* made up of a drawing data area for storing data which is drawn on the display 9 together with an offscreen area for storing source data for specified patterns which are not displayed on the display 9, a CRT controller 1607 for controlling the display on the display 9, and a RAMDAC 1608. Also, in the drawing, B1, B2, B3, and B4 are buses for transmitting data, address data, control data, and the like.

Any of the graphic drawing processors 600, 900, 1200, and 1400 used in the first, second, third, fourth, and fifth embodiments can be used as the graphic drawing processing device in the system of this embodiment.

The frame memory of the present embodiment has a double buffer structure, the use of which can be successively switched from display to drawing.

Multiport DRAMs (dual port Dynamic Random Access Memories, Video RAMs (VRAMs)) are used in the first frame memory 1605*a* and the second frame memory 1605*b*.

In the graphic drawing processing device 1600 of the present embodiment, the source data for texture patterns is set so as to form an interleaved structure in the offscreen areas of the first frame memory 1605*a* and the second frame memory 1605*b* respectively, and read-out can be performed while interleaving.

Seventh Embodiment

Figure 17:
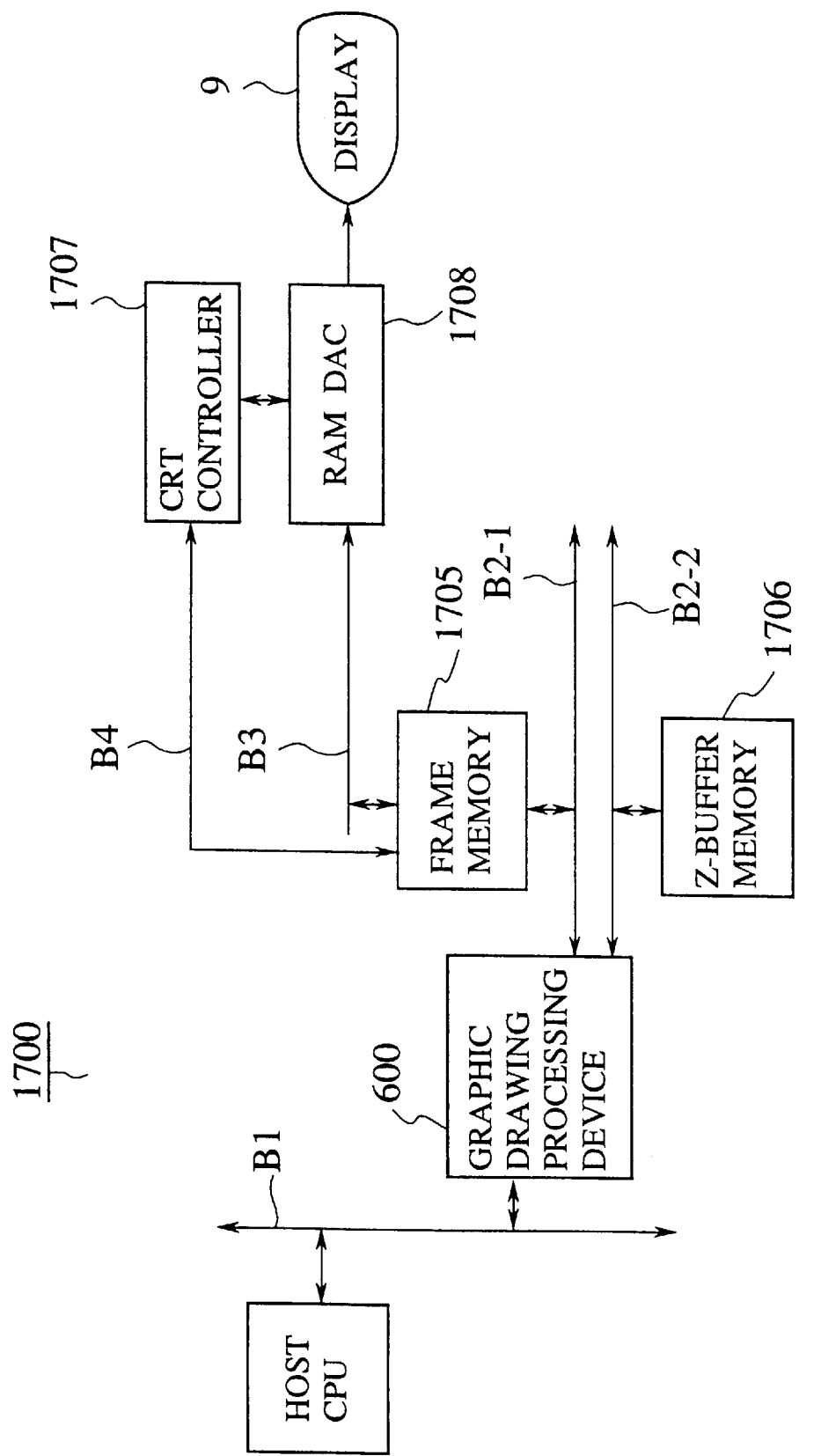
FIG. 17 is a general configuration drawing of a graphic drawing processing system as a seventh embodiment of the present invention.

FIG. 17 is a configuration drawing of a seventh embodiment of a graphic drawing processing system 1700 of the present invention. As shown in this drawing, the graphic drawing processing system 1700 includes a graphic drawing processing device 1400, a host CPU 3 for controlling the graphic drawing processing device 1400, a display 9 for displaying the graphics, a frame memory 1705 and a Z-buffer memory 1706 made up of a drawing data area for storing data which is drawn on the display 9 together with an offscreen area for storing source data for specified patterns which are not displayed on the display 9, a CRT controller 1707 for controlling the display on the display 9, and a RAMDAC 1708. Also, in the drawing, B1, B2, B3, and B4 are buses for transmitting data, address data, control data, and the like. Any of the graphic drawing processing devices 600, 900, 1200, and 1400 used in the first, second, third, and fourth embodiments may be used as the graphic drawing processing device of this embodiment, but an explanation will be given here using the graphic drawing processing device 1400.

The display section of the display 9 is made up of 1024×512 pixels. One pixel of frame data and one pixel of Z-data are displayed in 16 bits respectively. A multiport DRAM (dual port DRAM, Video RAM (VRAM)) is used as the frame memory 1705. An address is assigned to each pixel in the frame memory 1705, and the frame memory 1705 is accessed in one pixel units. The relationship between the display coordinates and an address 'address' of the frame memory 1705 is represented by the following equation (The page size=1024)

$$\text{address} = x + y \times 1024 \qquad (4).$$

The texture pattern is represented by four bits for one pixel, and the frame memory 1705 and the Z-buffer memory 1706 are mapped in 2048×2048 bits. In addition, the coordinates (u, v) in the texture pattern source space are represented by 11 bits respectively. In the coordinates (u, v) in the texture pattern source space, a four-bit portion $$(u, v) = (2x, 4y), (2x+1, 4y)(2x, 4y+1), (2x+1, 4y+1) \qquad (5)$$

is mapped in a two-dimensional address (x, y) for the frame memory 1705, and a four-bit portion $$(u, v) = (2xz, 4yz+2), (2xz+1, 4yz+2)(2xz, 4yz+3), (2xz+1, 4yz+3) \qquad (6)$$

is mapped in a two-dimensional address (xz, yz) for the Z-buffer memory 1706.

Figure 18:
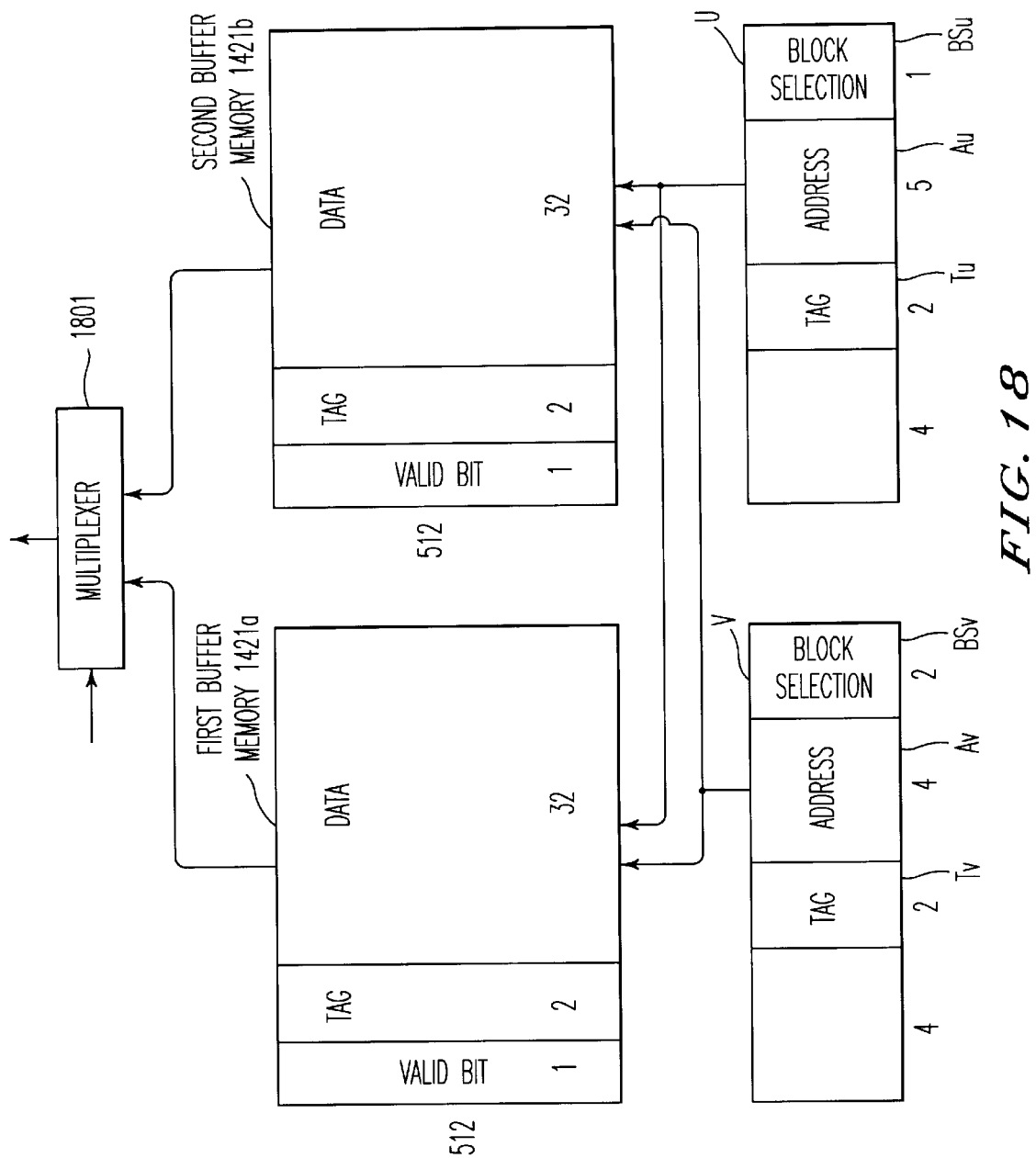
FIG. 18 is a drawing for explaining a buffer memory in the graphic drawing processing system as the seventh embodiment shown in FIG. 17.

FIG. 18 shows the configuration of the buffer memories 1421*a* and 1421*b* in the graphic drawing processing device 1400. This is a two-way buffer structure has a first buffer memory 1421*a* and a second buffer memory 1421*b*, a register V in which the coordinate v is stored and a register U in which the coordinate u is stored when the coordinates for the texture pattern source space are (u, v), as well as a comparator, a pair of shifters, and a multiplexer for selecting the output, which have been omitted from the drawing.

As shown in FIG. 18, the first buffer memory 1421*a* and the second buffer memory 1421*b* has memories of 512×34bits respectively. The registers U and V respectively use 12 bits combined with a lower order 6 bits as an address. As a result of this type of configuration, it is possible to have texture patterns of 64 pixels×64 pixels respectively. In addition, the seventh bit from the lower order of the registers U and V is a tag bit (two bits), and each entry of the first buffer memory 1421*a* and the second buffer memory 1421*b* also has a tag field of two bits, and each entry also has effective bits.

A texture mapping operation using this embodiment of the present invention is performed as follows. This texture mapping operation can also be used for the fifth embodiment.

(1) The area holding the necessary texture pattern for drawing the polygon from the data on the provided texture pattern source space is obtained. At this time, this area is restricted to a size which can be stored by the first buffer memory 1421*a* and the second buffer memory 1421*b* simultaneously, or less. (Specifically, no more than three pixels for which the address field is 128×128 bits or less, and, in addition, the same as the registers U and V, are included)

(2) The texture pattern data in this area described in (1) is read out from the frame memory 1705 and the Z-buffer memory 1706 and taken into the first buffer memory 1421*a* and the second buffer memory 1421*b* in the graphic drawing processing device 1400.

In the regional decision at this time, the second digital differential analysis section 1413, which performs the regional decision for drawing, does double duty. The conversion from the address (u, v) in the texture pattern source space to the addresses (x, y) and (xz, yz) for the frame memory 1705 and the Z-buffer memory 1706 is carried out as explained previously, and an eight pixel portion is read out at one time. Also, the read-out takes place in sequence, as in carrying out a high speed page mode.

(3) When inputting to the first buffer memory 1421*a* and the second buffer memory 1421*b*, first, all the effective bits are made "0". The texture pattern data is stored in the entries assigned to the address field for the registers U and V, and after storage the effective bits for the entry are made "1". The method used for selecting the first buffer memory 1421*a* or the second buffer memory 1421*b* for storage is as follows. When the effective bits of first buffer memory 1421*a* are "0", these bits are stored in first buffer memory 1421*a* and when the effective bits of the first buffer memory 1421*a* are "1", these bits are stored in the second buffer memory 1421*b*. The effective bits of the second buffer memory 1421*b* are not particularly necessary but this type of structure has been adopted in order to make the structure of the second buffer memory 1421*b* the same as that of the first buffer memory 1421*a*.

(4) When all the texture pattern data in the offscreen area in the frame memory is stored in the area of the buffer memories 1421*a* and 1421*b* in the above manner, the polygon is drawn using the data in the first buffer memory 1421*a* and the second buffer memory 1421*b*.

(5) During the drawing operation, tags Tu and Tv, addresses Au and Av, and block selection signals BSu and BSv are created from the coordinates (u, v) in the texture pattern source space obtained from the coordinate conversion section 1419 shown in FIG. 14, and set in the registers U and V shown in FIG. 18, and the first buffer memory 1421*a* and the second buffer memory 1421*b* shown in FIG. 14 are accessed. The tag data read out of the first buffer memory 1421*a* and the second buffer memory 1421*b* is compared with the tags Tu and Tv, using the comparator 1431, and the data in the buffer memory which is in agreement is selected by the multiplexer and output.

(6) The texture pattern data obtained in this manner is extended to 16 bits by the color look-up table 1423, multiplied by the value obtained by the first and second digital differential analysis sections 1413, and written into the drawing data area of the frame memory 1705. Z-buffering is also performed at this time.

In the above manner, with the present embodiment, there are limitations to the maximum size of the texture pattern used for one polygon, and in the fourth embodiment the buffer memories 1421*a* and 1421*b* of a relatively large volume in comparison with the cache memory 1421*b* are necessary. However, because it is possible to completely separate the read-out and write-in operations, in both operations it is possible to fully utilize the high speed mode, so that a higher performance graphic drawing processing device can be provided.

As outlined in the foregoing explanation, with the first to seventh embodiments of the graphic drawing processing systems or devices of the present invention, in a graphic system which can perform texture mapping, it is possible to draw at high speed while utilizing a section outside of the frame memory for a texture pattern. Therefore it is possible to perform high speed texture mapping with a comparatively inexpensive system. With three-dimensional graphics, texture mapping is an effective means for expressing real pictures with a simple process. With a graphic system using the first to seventh embodiments of the graphic drawing processing device of the present invention it is possible to obtain three-dimensional drawing which applies texture mapping. It is therefore possible to provide inexpensive three-dimensional CAD, three-dimensional game machines, and the like.

By means of the present invention as described above, in the case of drawing graphics such as a polygon or the like while performing texture mapping, the coordinate conversion means obtains the address for the pattern source data corresponding to the picture elements when writing into the drawing data area of the frame memory. The address obtained by the coordinate conversion means is compared in the comparison means with the address of the address area in the memory means. In the case where the desired pattern source data is in the memory means, this data is read out of the memory means and the picture elements are drawn. In the case where the desired pattern source data is not in the memory means, this data is read out of the offscreen area and stored in the memory means. After the pattern source data corresponding to the desired graphics is stored in the memory means, this data is written into the drawing data area while referring to the memory means. Therefore, when a DRAM is used as the frame memory in a graphic system which performs texture mapping, it is possible to perform texture mapping at high speed using high speed page mode while using a section outside of the frame memory for a texture pattern, during the drawing operation. As a result, it is possible to provide a graphic drawing processing device, with a comparatively inexpensive structure, which can implement high speed texture mapping.

It will be apparent that any modifications and variations may be implemented without departing from the scope of the novel concept of this invention. Therefore it is intended by the appended claims to cover all such modifications and variations which fall within the true spirit and scope of the invention.

What is claimed is:

1. A graphic drawing processing system comprising:
   a frame memory comprising:
      a drawing data area for holding on-screen data for drawing on a display; and
      an off-screen area for holding source data for a specified pattern which is not displayed on the display; and
   a graphic drawing processor connected to said frame memory for preparing image data to be written onto said frame memory on the basis of graphic information, said graphic drawing processor comprising:
      coordinate conversion means for obtaining pattern data corresponding to picture elements to be drawn, based on pattern source data stored in the off-screen area; and
      internal cache memory for storing one portion of the pattern source data in the off-screen data,
      wherein both the on-screen data and the portion of the pattern source data are stored respectively in the drawing data area and the internal cache memory in order to enable sequential access.

2. A graphic drawing processing system as claimed in claim 1, wherein
   the memory means stores source data patterns corresponding to a desired area in the offscreen area of the frame memory, in graphic units,
   the coordinate conversion means obtains an address for the pattern source data corresponding to all the picture elements which form the desired graphics when writing into the drawing data area of the frame memory, and
   the graphic drawing processing system reads out, from the offscreen area, the desired pattern source data corresponding to all the picture elements which form the desired graphics, stores the desired pattern source data into the memory means, and then writes the data into the drawing data area, while referring to the memory means.

3. A graphic drawing processing system as claimed in claim 2, wherein the graphics is one polygon.

4. A graphic drawing processing system as claimed in claim 2,
   wherein the memory means is made up of memories associated in m ways (where m is an integer, 2 or greater);
   the graphic drawing processing device has a selection means for selecting the output from the pattern source data corresponding to a common address, from the results of the comparison by the comparison means.

5. A graphic drawing processing device as claimed in claim 2,
   wherein the frame memory is formed from a plurality of banks and is controlled by an interleaved control method whereby the pattern source data inside each bank is accessed alternately.

6. A graphic drawing processing system as claimed in claim 2,
   wherein the graphic drawing processing system further has a digital differential analysis means for calculating paint-out with colors, and for making regional decisions.

7. A graphic drawing processing system as claimed in claim 2,
   wherein the graphic drawing processing system has a color look-up table for expressing the pattern source data in the offscreen area of the frame memory as an index color of a number of bits smaller than the a number of bits of frame data used for display.

8. A graphic drawing processing system as claimed in claim 7,
   wherein table data of a plurality of types for storing in the color look-up table is stored in the offscreen area of the frame memory, and
   the graphic drawing processing system reads out the desired table data from the offscreen area and rewrites this data in the color look-up table, as required.

9. A graphic drawing processing device as claimed in claim 1, wherein the memory means comprises:
   a data area for storing, in n picture element units (where n is an optional positive integer), a plurality of source data units for patterns corresponding to a desired region in the offscreen area of the frame memory; and
   an address area for storing addresses in the frame memory for data corresponding to the data area,
   the coordinate conversion means obtains an address for the pattern source data corresponding to the picture elements when writing into the drawing data area of the frame memory, and
   the graphic drawing processing system comprises:
      comparison means for comparing the address obtained from the coordinate conversion means with the address of the address area in the memory means, and
      wherein a picture element in the memory means is read out and is drawn from the results of the comparison by the comparison means, when the desired pattern source data is in the memory means, and a picture element stored in the offscreen area is read out and is drawn, when no desired pattern source data is in the memory means, and the contents which are read out are stored in memory means.

10. A graphic drawing processing system as claimed in claim 9,
    wherein the read-out of the pattern source data from the offscreen area in the frame memory and the write-in of the pattern source data to the memory means is performed in n picture element units.

11. A graphic drawing processing system as claimed in claim 9,
    wherein the memory means is made up of memories associated in m ways (where m is an integer, 2 or greater);
    the graphic drawing processing device has a selection means for selecting the output from the pattern source data corresponding to a common address, from the results of the comparison by the comparison means.

12. A graphic drawing processing device as claimed in claim 9,
    wherein the frame memory is formed from a plurality of banks and is controlled by an interleaved control method whereby the pattern source data inside each bank is accessed alternately.

13. A graphic drawing processing system as claimed in claim 1,
    wherein the memory means comprises:
       a plurality of data areas for storing source data patterns corresponding to a desired region in the off-screen area of the frame memory in n picture element units (where n is an optional integer); and
       an address area for storing addresses in the frame memory for data corresponding to the data area, the coordinate conversion means obtains an address for the pattern source data corresponding to the picture elements when writing into the drawing data area of the frame memory, the graphic drawing processing system comprises:

comparison means for comparing the address of the pattern source data corresponding to all the picture elements which form the desired graphics obtained from the coordinate conversion means, with the address of the address area in the memory means, and when the desired pattern source data corresponding to the picture elements for forming the desired graphics is in the memory means, the pattern source data is read out of the memory means as the result of the comparison by the comparison means, and when the desired pattern source data is not in the memory means, the pattern source data is read out of the offscreen area and is stored in the memory means, and, after the desired pattern source data for all the picture elements for forming the desired graphics is stored in the memory means, this pattern source data is written into the drawing data area while referring to the memory means.

14. A graphic drawing processing system as claimed in claim 13, wherein the graphics is one polygon.

15. A graphic drawing processing system as claimed in claim 13, wherein the read-out of the pattern source data from the offscreen area in the frame memory and the write-in of the pattern source data to the memory means is performed in n picture element units.

16. A graphic drawing processing system as claimed in claim 13, wherein the memory means is made up of memories associated in m ways (where m is an integer, 2 or greater);

the graphic drawing processing device has a selection means for selecting the output from the pattern source data corresponding to a common address, from the results of the comparison by the comparison means.

17. A graphic drawing processing device as claimed in claim 1, wherein the frame memory is formed from a plurality of banks and is controlled by an interleaved control method whereby the pattern source data inside each bank is accessed alternately.

18. A graphic drawing processing system as claimed in claim 1, wherein the graphic drawing processing system further has a digital differential analysis means for calculating paint-out with colors, and for making regional decisions.

19. A graphic drawing processing system as claimed in claim 1, wherein the graphic drawing processing system has a color look-up table for expressing the pattern source data in the offscreen area of the frame memory as an index color of a number of bits smaller than the a number of bits of frame data used for display.

20. A graphic drawing processing system as claimed in claim 19, wherein table data of a plurality of types for storing in the color look-up table is stored in the offscreen area of the frame memory, and the graphic drawing processing system reads out the desired table data from the offscreen area and rewrites this data in the color look-up table, as required.

21. A graphic drawing processor comprising:

a first interface section through which said graphic drawing processor receives and outputs graphic data;

a second interface section through which said graphic drawing processor exchanges graphic data with a frame memory whose memory locations are shared by an on-screen area for holding image data to be displayed on a monitor and an off-screen area for holding texture patterns;

a graphic data processing circuit connected to said first and second interface section for preparing image data to be written onto said frame memory on the basis of graphic information; and buffering means connected to said second interface section and said graphic data processing circuit for storing parts of texture patterns, wherein, when image data to be written onto said frame memory is prepared by the use of one of said texture patterns which is held in said frame memory and also in said buffering means, said graphic data processing circuit obtains said one of said texture patterns from said buffering means in place of said frame memory, wherein both the image data to be displayed and the parts of texture patterns are stored respectively in the drawing data area and the buffering means in order to enable sequential access.

22. A graphic drawing processor comprising:

a first interface section through which said graphic drawing processor receives and outputs graphic data;

a second interface section through which said graphic drawing processor exchanges graphic data with a frame memory whose memory locations are shared by an on-screen area for holding image data to be displayed on a monitor and an off-screen area for holding texture patterns;

a graphic data processing circuit connected to said first and second interface section for preparing image data to be written onto said frame memory on the basis of graphic information; and internal cache memory connected to said second interface section and said graphic data processing circuit for storing parts of texture patterns, wherein, when image data to be written onto said frame memory is prepared by the use of one of said texture patterns which is held in said frame memory and also in said internal cache memory, said graphic data processing circuit obtains said one of said texture patterns from said internal cache memory in place of said frame memory, wherein both the image data to be displayed and the parts of texture patterns are stored respectively in the drawing data area and the internal cache memory in order to enable sequential access.

23. In a graphic processing system comprising a frame memory whose memory locations are shared by an on-screen area for holding graphic image to be displayed on a monitor and an off-screen area for holding texture patterns, a controller connected to said frame memory for serially outputting graphic data to a display, a host CPU, a graphic drawing processor connected to said host CPU in order to exchange graphic information for writing said graphic image with said host CPU and write in said frame memory said graphic image to be displayed by the use of a texture stored in the off-screen area for acceleration of writing the graphic image, said graphic drawing processor comprising:

a first interface section through which said graphic drawing processor receives and outputs graphic data;

a second interface section through which said graphic drawing processor exchanges graphic data with said frame memory; and a graphic data processing circuit connected to said first and second interface section for preparing image data to be written onto said frame memory on the basis of the graphic information, wherein access to said off-screen area by said graphic drawing processor is accelerated by providing a cache memory connected to said second interface section.

* * * * *